(12) United States Patent  (10) Patent No.: US 7,762,220 B2
Okanovic et al.  (45) Date of Patent: Jul. 27, 2010

(54) VALVE ASSEMBLY FOR A TWO-STROKE ENGINE

(75) Inventors: Midhat Okanovic, Attnang Puchheim (AT); Gunther Zauner, Peuerbach (AT)

(73) Assignee: BRP-Powertrain GmbH & Co kg, Gunskirchen (AT)

( * ) Notice: Subject to any disclaimer, the term of this patent is extended or adjusted under 35 U.S.C. 154(b) by 341 days.

(21) Appl. No.: 12/023,293

(22) Filed: Jan. 31, 2008

(65) Prior Publication Data

US 2009/0088942 A1 Apr. 2, 2009

(30) Foreign Application Priority Data

Sep. 28, 2007 (CA) .................................... 2605311

(51) Int. Cl.
*F02B 25/00* (2006.01)
(52) U.S. Cl. ................................. 123/65 PE; 123/65 R
(58) Field of Classification Search .............. 123/65 PE
See application file for complete search history.

(56) References Cited

U.S. PATENT DOCUMENTS

| | | | | |
|---|---|---|---|---|
| 5,697,332 | A | * | 12/1997 | Asai et al. ................ 123/65 PE |
| 5,934,958 | A | * | 8/1999 | Ochiai ....................... 440/89 R |
| 6,216,648 | B1 | | 4/2001 | Spaulding |
| 6,244,227 | B1 | | 6/2001 | Matte |
| 6,481,394 | B1 | * | 11/2002 | Hiki ........................ 123/65 PE |
| 6,647,933 | B2 | * | 11/2003 | Tsukada et al. ........... 123/41 E |
| 6,810,839 | B2 | * | 11/2004 | Gohou ..................... 123/65 PE |
| 7,213,544 | B2 | | 5/2007 | Zauner |
| 2007/0186882 | A1 | * | 8/2007 | Zauner .................... 123/65 PE |

FOREIGN PATENT DOCUMENTS

| | | | | |
|---|---|---|---|---|
| JP | 63186914 | A | * | 8/1988 |
| JP | 05133230 | A | * | 5/1993 |
| JP | 06235020 | A | * | 8/1994 |

OTHER PUBLICATIONS

U.S. Appl. No. 11/625,734. Title: Valve Assembly for a Two-Stroke Engine, filed Jan. 22, 2007.

* cited by examiner

*Primary Examiner*—Noah Kamen
(74) *Attorney, Agent, or Firm*—Osler, Hoskin & Harcourt LLP

(57) ABSTRACT

A two-stroke internal combustion engine is disclosed having first and second cylinders having respective exhaust ports. A valve assembly comprises at least one valve actuator. First and second valves are operatively connected to the at least one valve actuator. The first and second valves are each movable between a first position wherein the valve extends a first distance in the respective exhaust port and a second position wherein the valve extends a second distance in the respective exhaust port. A valve connecting member is rigidly connected to the first and second valves and movable therewith via a translational motion while maintaining a substantially constant angular orientation relative to the cylinder block. A position sensor has a first portion connected to the cylinder block and a second portion connected to the valve connecting member. An electronic control unit (ECU) electrically connected to the position sensor.

23 Claims, 19 Drawing Sheets

VALVE ASSEMBLY FOR A TWO-STROKE ENGINE

CROSS REFERENCE

The present application claims priority to Canadian Patent Application 2,605,311 filed on Sep. 28, 2007, entitled "Exhaust Valve Position Feedback Control and Lubrication Thereof", the entirety of which is incorporated herein by reference.

FIELD OF THE INVENTION

The present invention relates to a valve assembly suitable for use with the exhaust ports of a multi-cylinder two-stroke internal combustion engine.

BACKGROUND OF THE INVENTION

In order to ensure that two-stroke engines have a high power capacity at high speeds, a high volumetric efficiency is required and the charge losses must be minimized. This can be accomplished by an early and therefore higher opening of the exhaust passage into the cylinder. The adjustment of the exhaust port, to obtain maximum power capacity of the engine at high speeds involves, in the medium speed range, not only an appreciable decrease of the useful stroke, but also a large increase of the charge losses. As a result, the torque decreases and the specific fuel consumption increases greatly. A higher torque in conjunction with a lower fuel consumption can be obtained, at lower engine speeds, only if the opening of the exhaust port happens later in the down stroke of the piston which means that the exhaust port must be at a lower position than it is at high engine speeds.

For this purpose it is known to provide, in the exhaust port, a valve which is movable between a full flow position and a flow restricting position. When in the flow restricting position, the end of the valve is substantially flush with the peripheral surface of the cylinder bore. In this flow restricting position, the exhaust port is effectively lowered in relation to the down stroke of the piston. The valve is adjustable to vary the relative height of the exhaust port as is required by the given operating conditions of the engine.

Over the course of the engine's life, a process known as "coking" occurs, in which byproducts of fuel combustion in the cylinders are deposited and accumulate on various components in the exhaust path of the engine, including the movable valve. The accumulation of coking deposits can impede the movement of the valve between the full flow position and the flow restricting position. As a result, the actual position of the valve may differ from the desired position, resulting in reduced engine performance. In addition, if the valve is not in the desired position due to coking or other impediments, its actual position is not easily determinable and it is difficult to adjust either the valve position or other aspects of engine performance such as the fuel-air ratio to be appropriate for the actual valve position. In addition, coking in one or more cylinders of a multi-cylinder engine may result in the valves of two or more different cylinders being in different positions. As a result, some of the cylinders will have different performance characteristics, which can adversely affect engine performance, fuel economy and rider comfort, as well as causing premature wear to engine parts.

Therefore, there is a need for a movable valve assembly suitable for use with two or more exhaust ports of a two-stroke internal combustion engine with a reduced likelihood of having its movement impeded due to coking.

There is also a need for a movable valve assembly suitable for use with two or more exhaust ports of a two-stroke internal combustion engine, wherein a difference in position between an actual position of the valves and a desired position of the valves can be determined.

There is also a need for a movable valve assembly suitable for use with two or more exhaust ports of a two-stroke internal combustion engine, wherein discrepancies in valve position between the exhaust ports are reduced.

SUMMARY OF THE INVENTION

It is an object of the present invention to ameliorate at least some deficiencies of the prior art.

It is also an object of the present invention to provide a movable valve assembly suitable for use with two or more exhaust ports of a two-stroke internal combustion engine with a reduced likelihood of having its movement impeded due to coking.

It is also an object of the present invention to provide a movable valve assembly suitable for use with two or more exhaust ports of a two-stroke internal combustion engine, wherein a difference in position between an actual position of the valves and a desired position of the valves can be determined.

It is also an object of the present invention to provide a movable valve assembly suitable for use with two or more exhaust ports of a two-stroke internal combustion engine, wherein discrepancies in valve position between the exhaust ports are reduced.

In one aspect, the invention provides an internal combustion engine comprising a crankcase. A crankshaft is disposed in the crankcase. A cylinder block is connected to the crankcase. First and second cylinders are disposed in the cylinder block. The first cylinder has a first exhaust port. The second cylinder has a second exhaust port. A first piston is movably disposed within the first cylinder. A second piston is movably disposed within the second cylinder. The first and second pistons are operatively connected to the crankshaft. A valve assembly is operatively connected to the cylinder block. The valve assembly comprises at least one valve actuator. A first valve is operatively connected to the at least one valve actuator. The first valve is movable between a first position wherein the first valve extends a first distance in the first exhaust port and a second position wherein the first valve extends a second distance in the first exhaust port. The second distance is less than the first distance. A second valve is operatively connected to the at least one valve actuator. The second valve is movable between a first position wherein the second valve extends a first distance in the second exhaust port and a second position wherein the second valve extends a second distance in the second exhaust port. The second distance is less than the first distance. A valve connecting member is connected to the first and second valves and movable therewith. A position sensor has first and second portions. The first portion of the position sensor is connected to the cylinder block. The second portion of the position sensor is connected to the valve connecting member. An electronic control unit (ECU) is electrically connected to the position sensor. The engine operates on a two-stroke principle.

In a further aspect, the first and second valves are biased toward one of the first position and the second position.

In a further aspect, each of the first and second valves is movable to a third position intermediate the first position and the second position.

In a further aspect, the first and second valves are biased toward the third position.

In a further aspect, each of the exhaust ports is a main exhaust port. Each of the first and second cylinders further includes at least two auxiliary exhaust ports symmetrically disposed with respect to the corresponding main exhaust port. Each auxiliary exhaust port communicates with the main exhaust port via an auxiliary exhaust passage. Each of the first and second valves further includes at least two auxiliary valves separate from and movably connected to the corresponding valve and movable therewith. Each auxiliary valve extends in a respective auxiliary exhaust port.

In a further aspect, the at least one valve actuator comprises a first actuator for actuating the first valve and a second actuator for actuating the second valve.

In a further aspect, each of the first and second actuators comprises a diaphragm. A pressure chamber is defined at least in part by the diaphragm. The pressure chamber is fluidly connectable to at least one pressure source, via a pressure control device. The pressure chamber has a volume variable in response at least in part to pressure supplied to the pressure chamber by the at least one pressure source.

In a further aspect, the first and second valves are disposed at least in part outside the cylinder block. The position sensor is disposed outside the cylinder block.

In a further aspect, the valve connecting member is connected to the first and second valves via respective portions of the first and second valves disposed outside the cylinder block.

In a further aspect, the position sensor is a Hall effect sensor.

In a further aspect, a third cylinder is disposed in the cylinder block. The third cylinder has a third exhaust port. A third piston is movably disposed within the third cylinder and operatively connected to the crankshaft. The valve assembly further has a third valve operatively connected to the at least one valve actuator. The third valve is movable between a first position wherein the third valve extends a first distance in the third exhaust port and a second position wherein the third valve extends a second distance in the third exhaust port, the second distance being less than the first distance. The valve connecting member is additionally connected to the third valve and movable therewith.

In a further aspect, a fourth cylinder is disposed in the cylinder block. The fourth cylinder has a fourth exhaust port. A fourth piston is movably disposed within the fourth cylinder and operatively connected to the crankshaft. The valve assembly further has a fourth valve operatively connected to the at least one valve actuator. The fourth valve is movable between a first position wherein the fourth valve extends a first distance in the fourth exhaust port and a second position wherein the third valve extends a second distance in the fourth exhaust port. The second distance is less than the first distance. The valve connecting member is additionally connected to the third valve and movable therewith.

It is another object of the present invention to provide an internal combustion engine comprising a crankcase. A crankshaft is disposed in the crankcase. A cylinder block is connected to the crankcase. First and second cylinders are disposed in the cylinder block. The first cylinder has a first exhaust port. The second cylinder has a second exhaust port. A first piston is movably disposed within the first cylinder and a second piston is movably disposed within the second cylinder. The first and second pistons are operatively connected to the crankshaft. A valve assembly is operatively connected to the cylinder block. The valve assembly comprises at least one valve actuator. A first valve is operatively connected to the at least one valve actuator. The first valve is movable between a first position wherein the first valve extends a first distance in the first exhaust port and a second position wherein the first valve extends a second distance in the first exhaust port. The second distance is less than the first distance. A second valve is operatively connected to the at least one valve actuator. The second valve is movable between a first position wherein the second valve extends a first distance in the second exhaust port and a second position wherein the second valve extends a second distance in the second exhaust port. The second distance is less than the first distance. A valve connecting member is rigidly connected to the first and second valves and movable therewith between a first position and a second position. The valve connecting member is movable between the first position and the second position via a translational motion while maintaining a substantially constant angular orientation relative to the cylinder block. The engine operates on a two-stroke principle.

In a further aspect, the first and second valves are biased toward one of the first position and the second position.

In a further aspect, each of the first and second valves is movable to a third position intermediate the first position and the second position.

In a further aspect, the first and second valves are biased toward the third position.

In a further aspect, each of the exhaust ports is a main exhaust port. Each of the first and second cylinders further includes at least two auxiliary exhaust ports symmetrically disposed with respect to the corresponding main exhaust port. Each auxiliary exhaust port communicates with the main exhaust port via an auxiliary exhaust passage. Each of the first and second valves further includes at least two auxiliary valves separate from and movably connected to the corresponding valve and movable therewith. Each auxiliary valve extends in a respective auxiliary exhaust port.

In a further aspect, the at least one valve actuator comprises a first actuator for actuating the first valve and a second actuator for actuating the second valve.

In a further aspect, each of the first and second actuators comprises a diaphragm. A pressure chamber is defined at least in part by the diaphragm. The pressure chamber is fluidly connectable to at least one pressure source, via a pressure control device. The pressure chamber has a volume variable in response at least in part to pressure supplied to the pressure chamber by the at least one pressure source.

In a further aspect, the first and second valves are disposed at least in part outside the cylinder block. The position sensor is disposed outside the cylinder block.

In a further aspect, the valve connecting member is connected to the first and second valves via respective portions of the first and second valves disposed outside the cylinder block.

In a further aspect, a third cylinder is disposed in the cylinder block. The third cylinder has a third exhaust port. A third piston is movably disposed within the third cylinder and operatively connected to the crankshaft. The valve assembly further has a third valve operatively connected to the at least one valve actuator. The third valve is movable between a first position wherein the third valve extends a first distance in the third exhaust port and a second position wherein the third valve extends a second distance in the third exhaust port. The second distance is less than the first distance. The valve connecting member is additionally rigidly connected to the third valve and movable therewith.

In a further aspect, a fourth cylinder is disposed in the cylinder block. The fourth cylinder has a fourth exhaust port. A fourth piston is movably disposed within the fourth cylinder and operatively connected to the crankshaft. The valve assembly further has a fourth valve operatively connected to the at least one valve actuator. The fourth valve is movable between a first position wherein the fourth valve extends a first distance in the fourth exhaust port and a second position wherein the third valve extends a second distance in the fourth exhaust port. The second distance is less than the first distance. The valve connecting member is additionally rigidly connected to the third valve and movable therewith.

For purposes of this application, the term "ambient pressure" means a pressure of the surrounding fluid. The term "positive pressure" means a pressure which is greater than an ambient pressure. The term "negative pressure" means a pressure which is lower than an ambient pressure. The term "neutral position" used in conjunction with a spring means that the spring is not in extension or in compression.

Embodiments of the present invention each have at least one of the above-mentioned objects and/or aspects, but do not necessarily have all of them.

Additional and/or alternative features, aspects, and advantages of the embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

Figure 1:
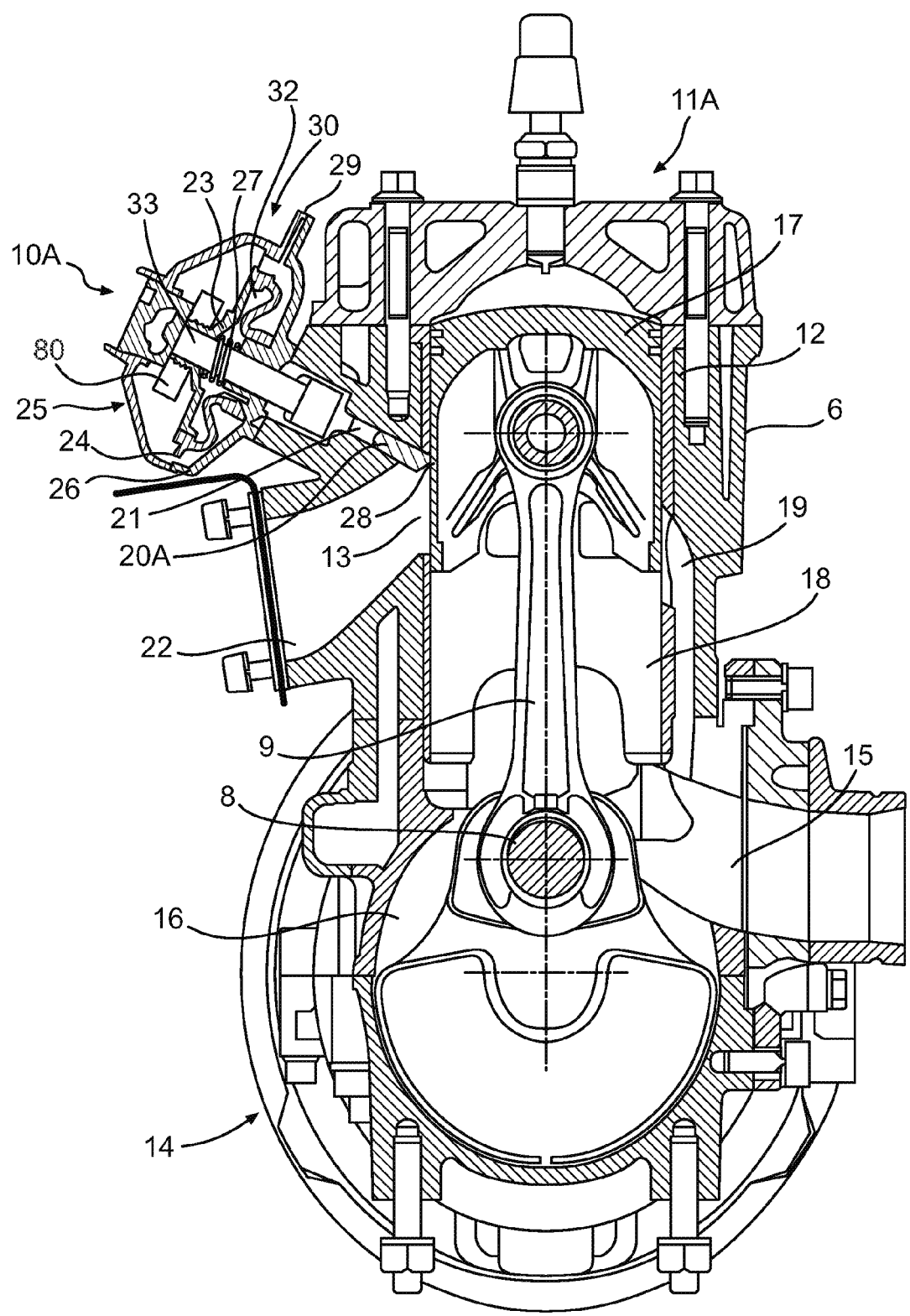
FIG. 1 is a cross-sectional view of a two-cylinder two-stroke engine having a first embodiment of a valve assembly in accordance with aspects of the present invention.

A valve assembly 10 in accordance with aspects of the present invention, which is described in greater detail below, comprises two valve actuators 30 and 130. A valve 20 is connected to the actuator 30 and a valve 120 is connected to the actuator 130. In FIG. 1, a first embodiment of the valve assembly 10 is valve assembly 10A having the actuators 30, 130 (both of which can be seen in FIG. 11) and where the valves 20, 120 are one-part valves 20A, 120A. It is contemplated that the valves 20, 120 may alternatively both be actuated by a single actuator 30. As shown in FIG. 1 the valve assembly 10A is operatively connected to a two-cylinder two-stroke engine 11A. It should be understood that the two-stroke engine 11A may have more than two cylinders, as will be described below. The engine 11A comprises a crankcase 14 and a cylinder block 6 connected to the crankcase 14. Two cylinders 12 (both of which can be seen in FIG. 12), disposed in the cylinder block 6, each have a respective exhaust port 13. The cylinders 12 may be formed in the cylinder block 6 in any suitable manner known in the art, such as by disposing cylinder liners in respective cylindrical bores formed in the cylinder block 6, or by coating the inner surface of each of the cylindrical bores with a suitable coating such as Nicasil. An exhaust passage 22 communicates with each cylinder 12 via the respective exhaust port 13. The crankcase 14 has respective admission ports 15 and internal chambers 16 corresponding to each cylinder 12. A crankshaft 8 is disposed in the internal chambers 16 of the crankcase 14. Two pistons 17 are connected to the crankshaft 8 via respective connecting rods 9 and are reciprocable in the respective cylinder bores 18. The pistons 17 are each adapted to open or close a corresponding exhaust port 13 and a corresponding transferring port 19. The operation of only one cylinder 12 and its valve 20 will be described below, and it should be understood that the other cylinder 12 and the valve 120 operates in a similar manner.

Figure 11:
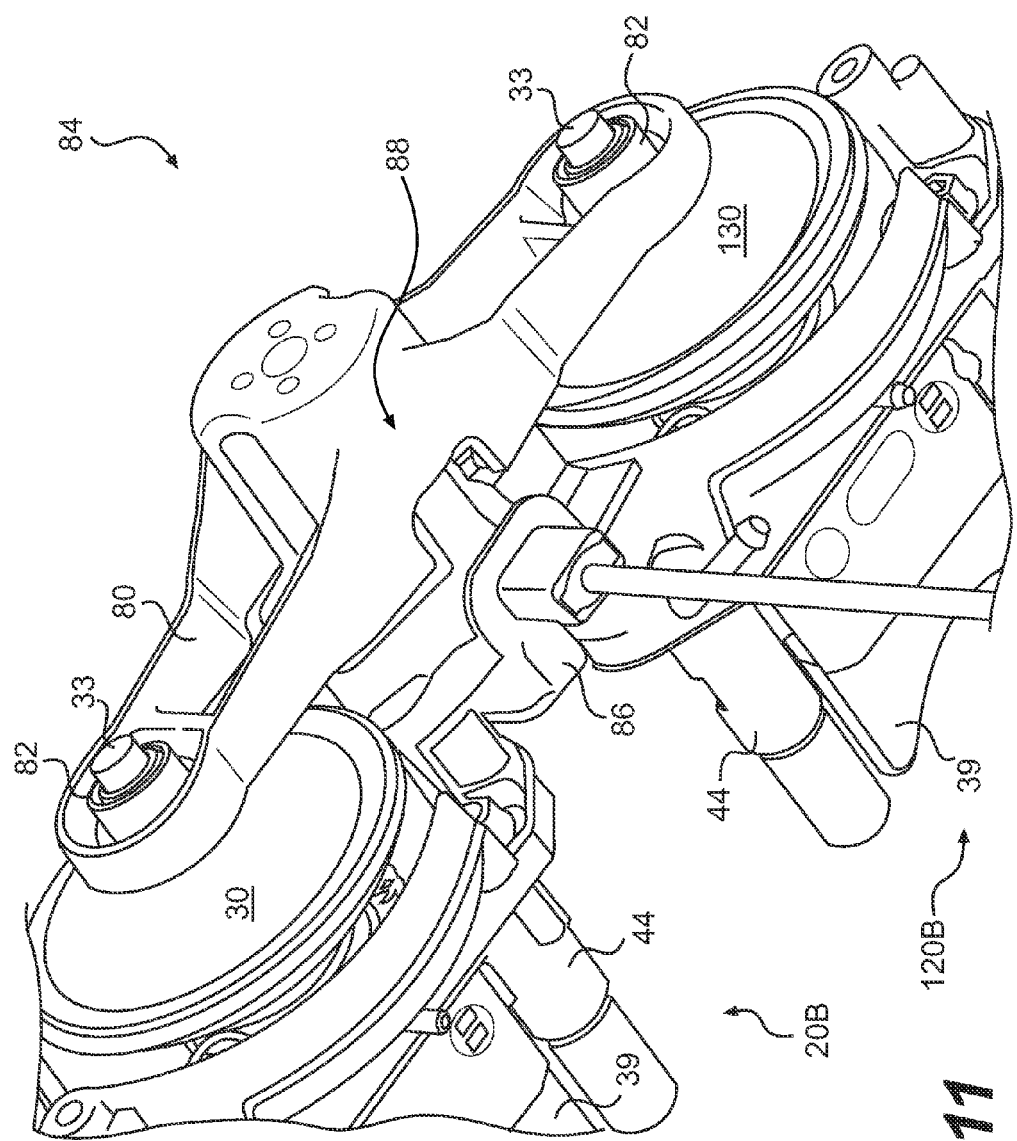
FIG. 11 is a perspective view of the valves, actuators and valve connecting member of the engine of FIG. 2.

When the engine 11A is operating at low or medium speeds, the exhaust port 13 should not be exposed prematurely by the piston 17, as the latter moves downwardly. Such a premature exposure of the exhaust port 13 is prevented by the valve 20A. The valve 20A is slidably mounted in a guide channel 21 having a longitudinal direction that is approximately radial with respect to cylinder bore 18 and extends at an acute angle to the axis of the exhaust passage 22. An edge 28 of the valve 20A is shaped so as to match the shape of the cylinder bore 18 of the cylinder 12. As will become apparent from the following description, the valve actuator 30 is adapted to move the valve 20A between a first flow restricting position where the valve 20A extends a first distance in the exhaust port 13, a second full flow position where the valve 20A is withdrawn from the exhaust port 13, and a third intermediate position where the valve 20A extends a second distance in the exhaust port 13, such that it is in a position which is intermediate the first position and the second position. Since the second distance is less than the first distance, the valve 20A, when in the third position, does not restrict the flow of exhaust gases through the exhaust port 13 as much as when it is in the first position. The valve actuator 30 biases the valve 20A toward the third position. A valve connecting member in the form of a bar 80 is rigidly attached to the connectors 33 of the two valves 20A, 120A via threaded nuts 82, as can be seen in FIG. 11. It is contemplated that any other suitable connection method known in the art may be used, and that the bar 80 may alternatively be connected to any suitable portion of the valves 20A, 120A. The bar 80 moves together with the valves 20A, 120A as they are actuated by the valve actuators 30, and maintains a constant angular orientation relative to the valves 20A, 120A and the cylinder block 6, thereby ensuring that both valves 20A, 120A remain in the same position relative to one another.

Figure 2:
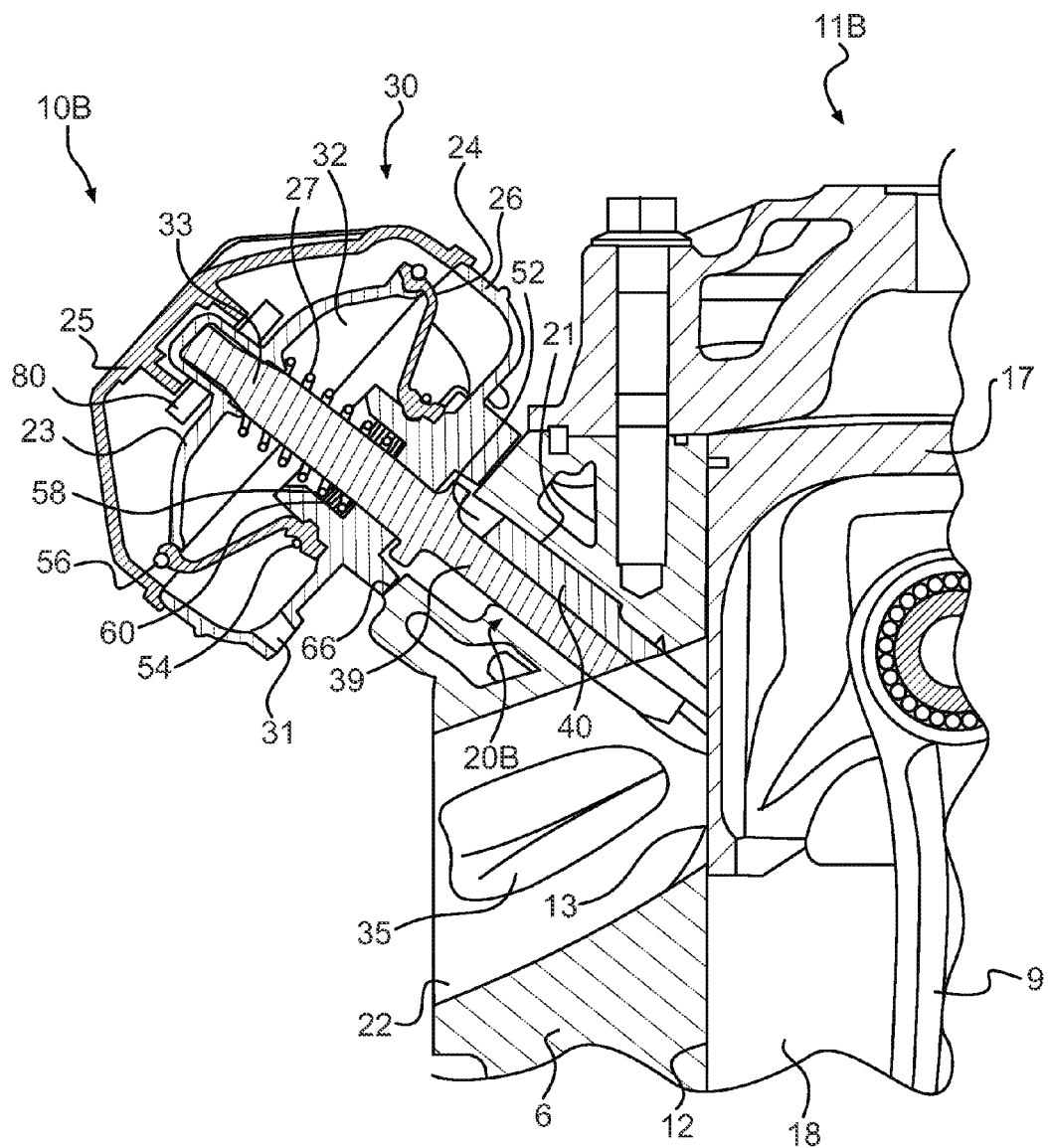
FIG. 2 is a cross-sectional view of a two-stroke engine having a second embodiment of a valve assembly in accordance with aspects of the present invention, a valve of the valve assembly having a first valve part and a second valve part.
Figure 3:
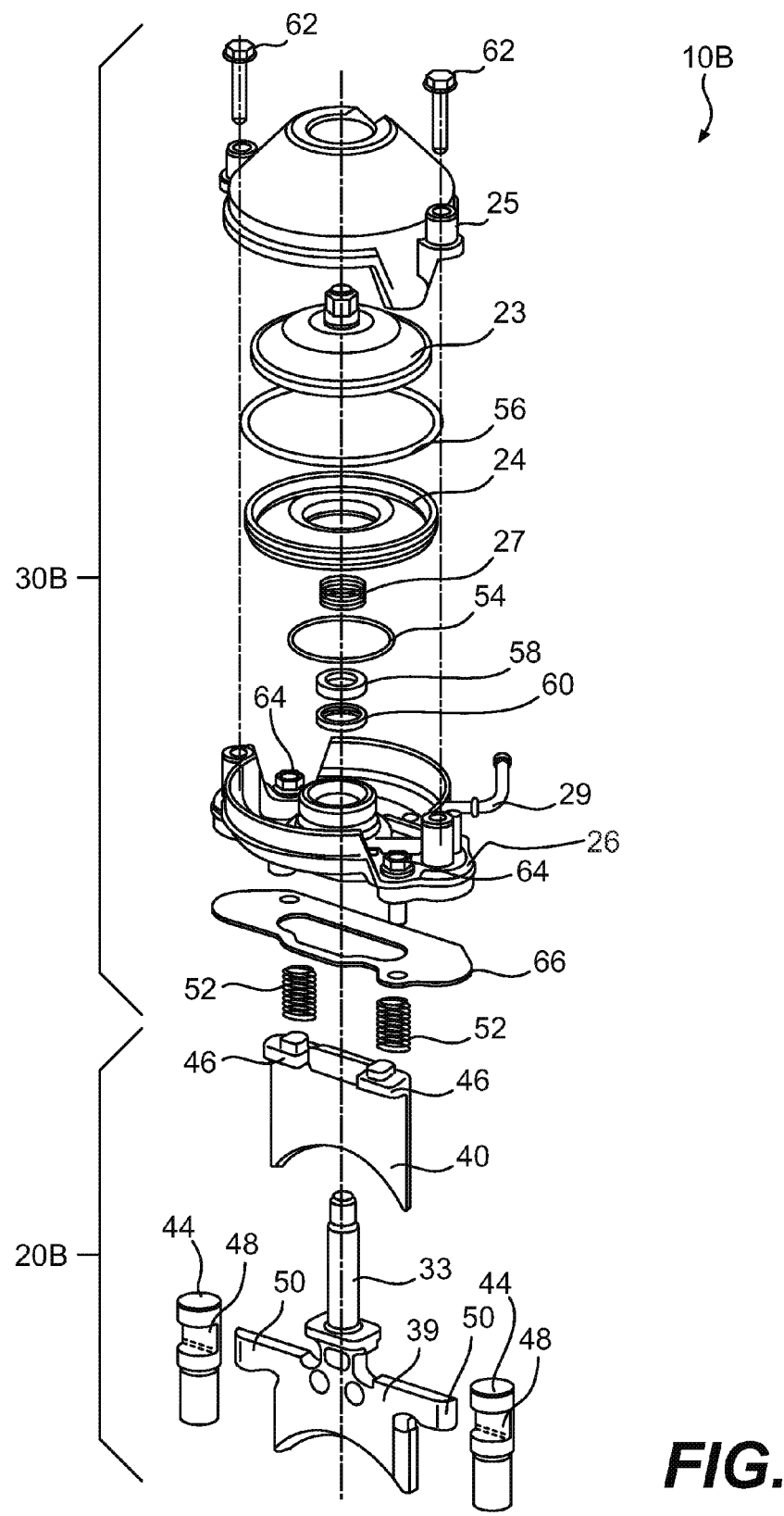
FIG. 3 is an exploded view of the valve assembly of FIG. 2.
Figure 4:
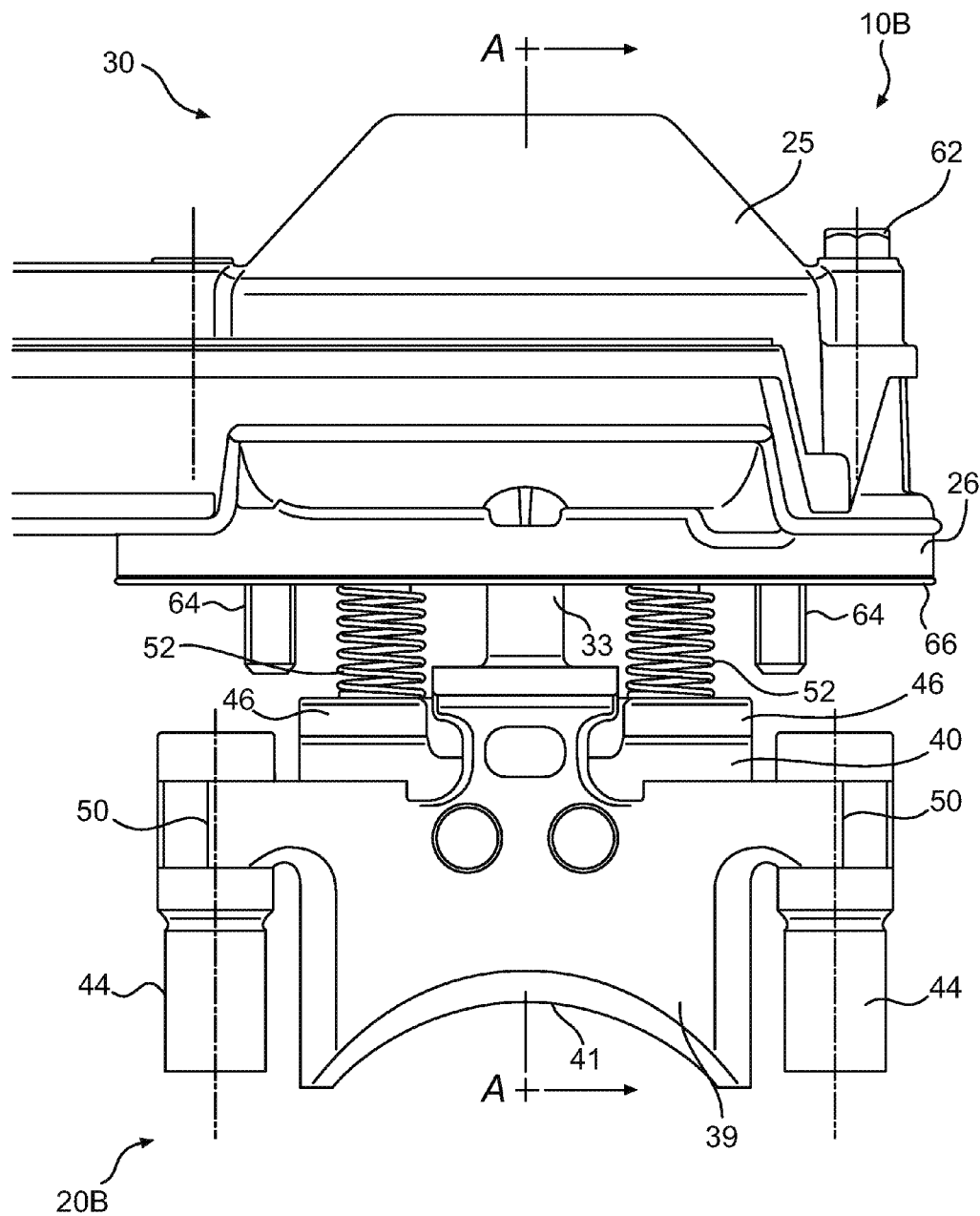
FIG. 4 is a side elevation view of the valve assembly of FIG. 2.
Figure 5:
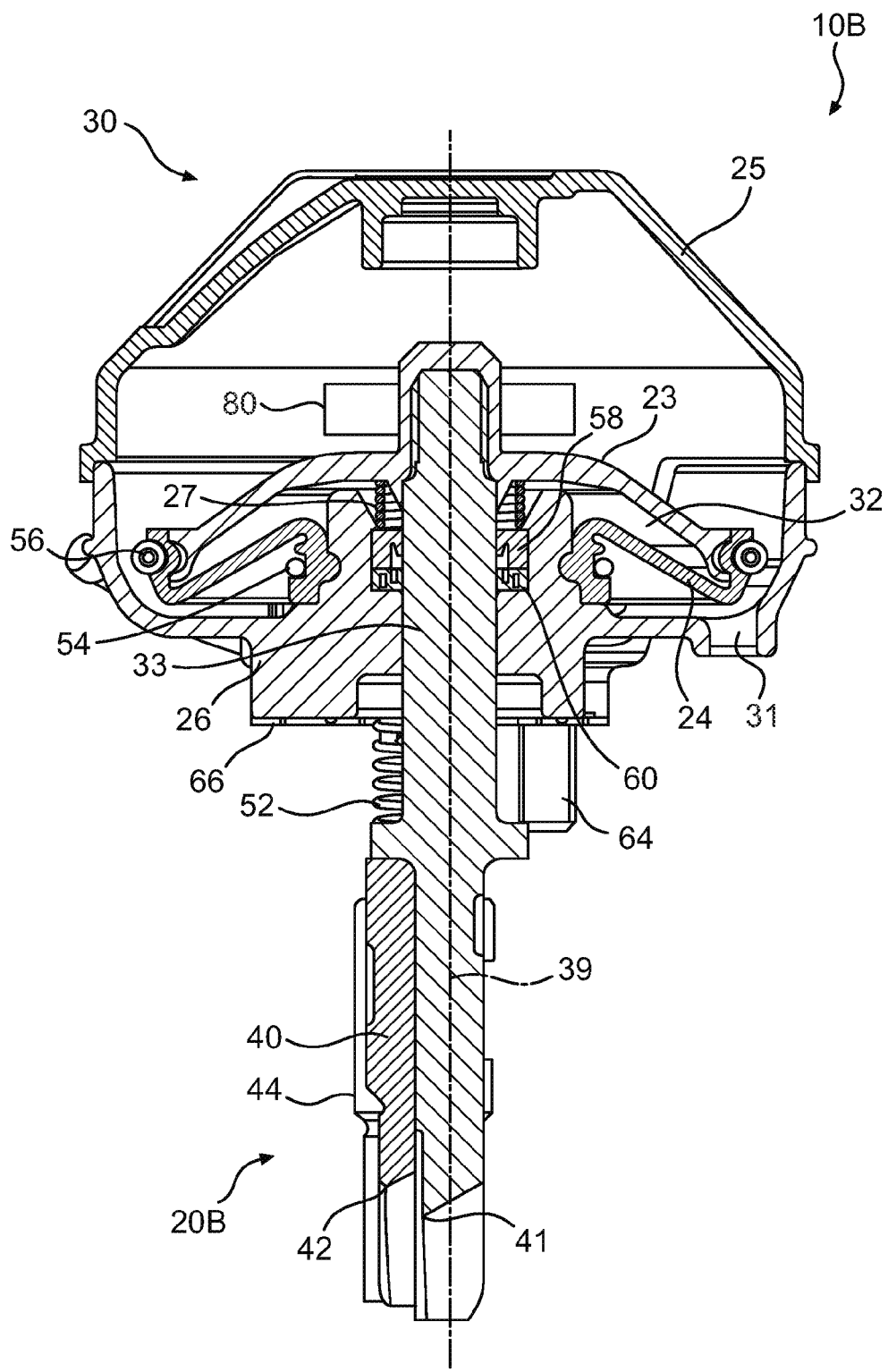
FIG. 5 is a cross-sectional view, taken through line A-A of FIG. 4, of the valve assembly of FIG. 2.
Figure 6:
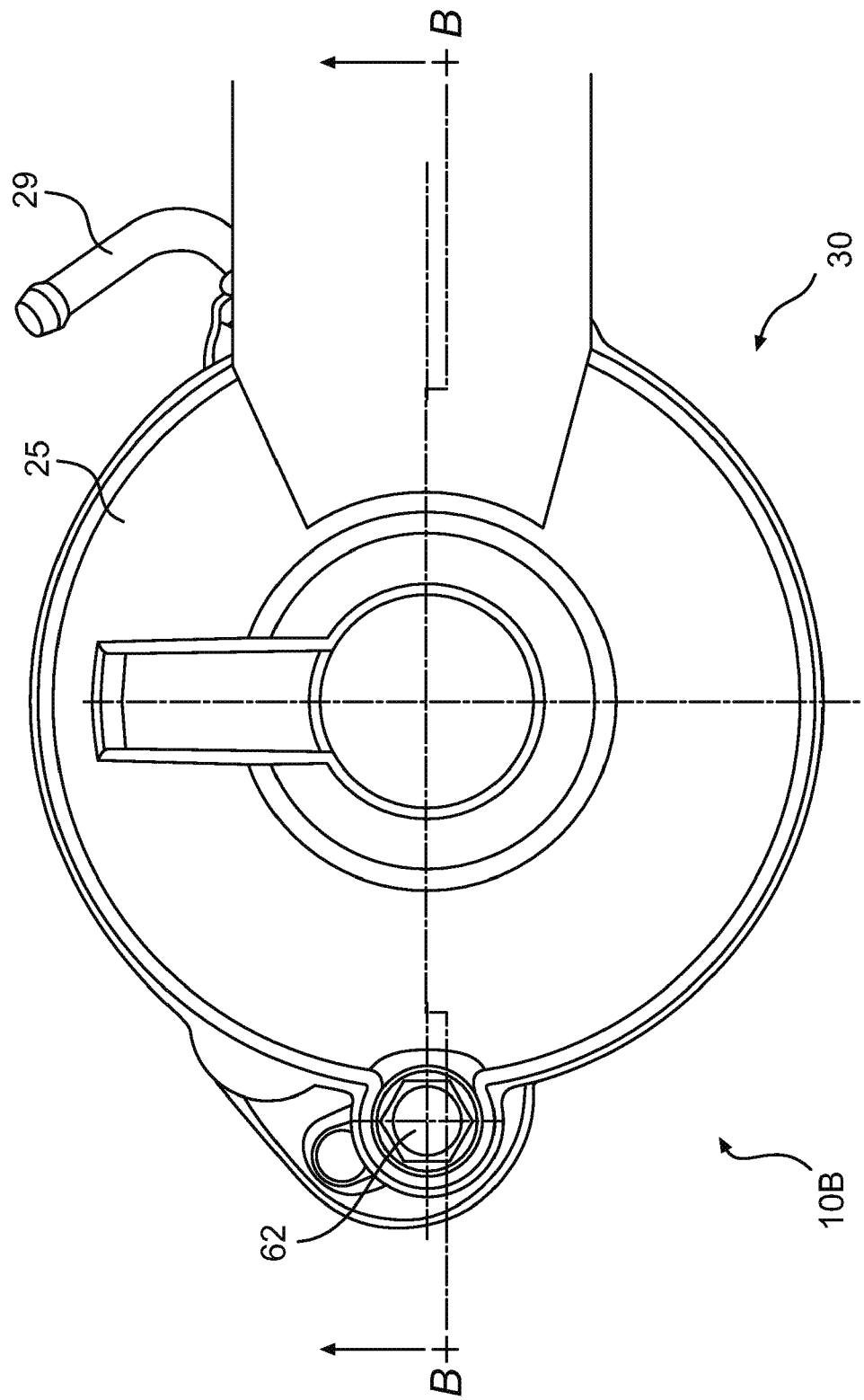
FIG. 6 is a top view of the valve assembly of FIG. 2.
Figure 7:
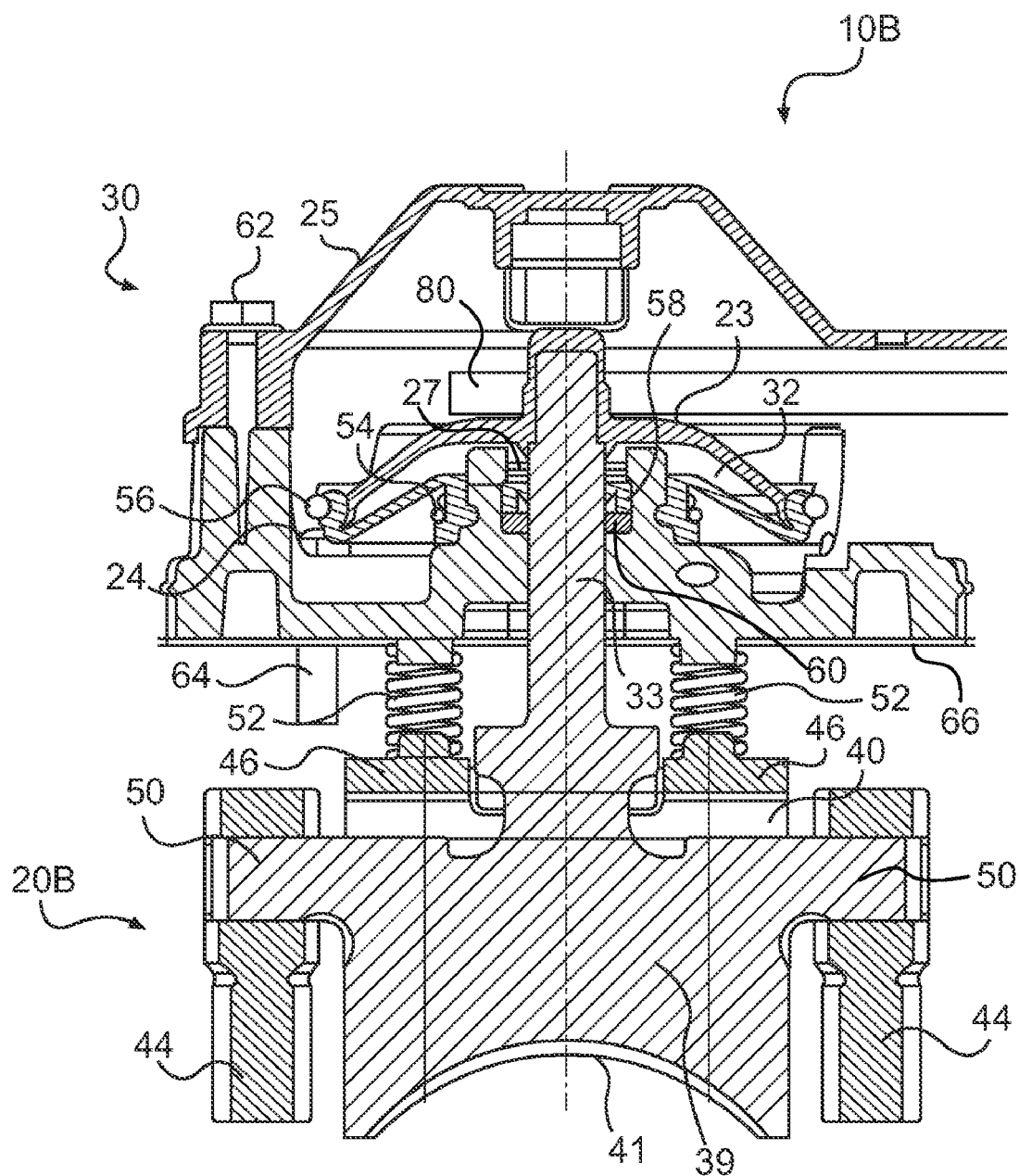
FIG. 7 is a cross-sectional view, taken through line B-B of FIG. 6; of the valve assembly of FIG. 2.
Figure 9A:
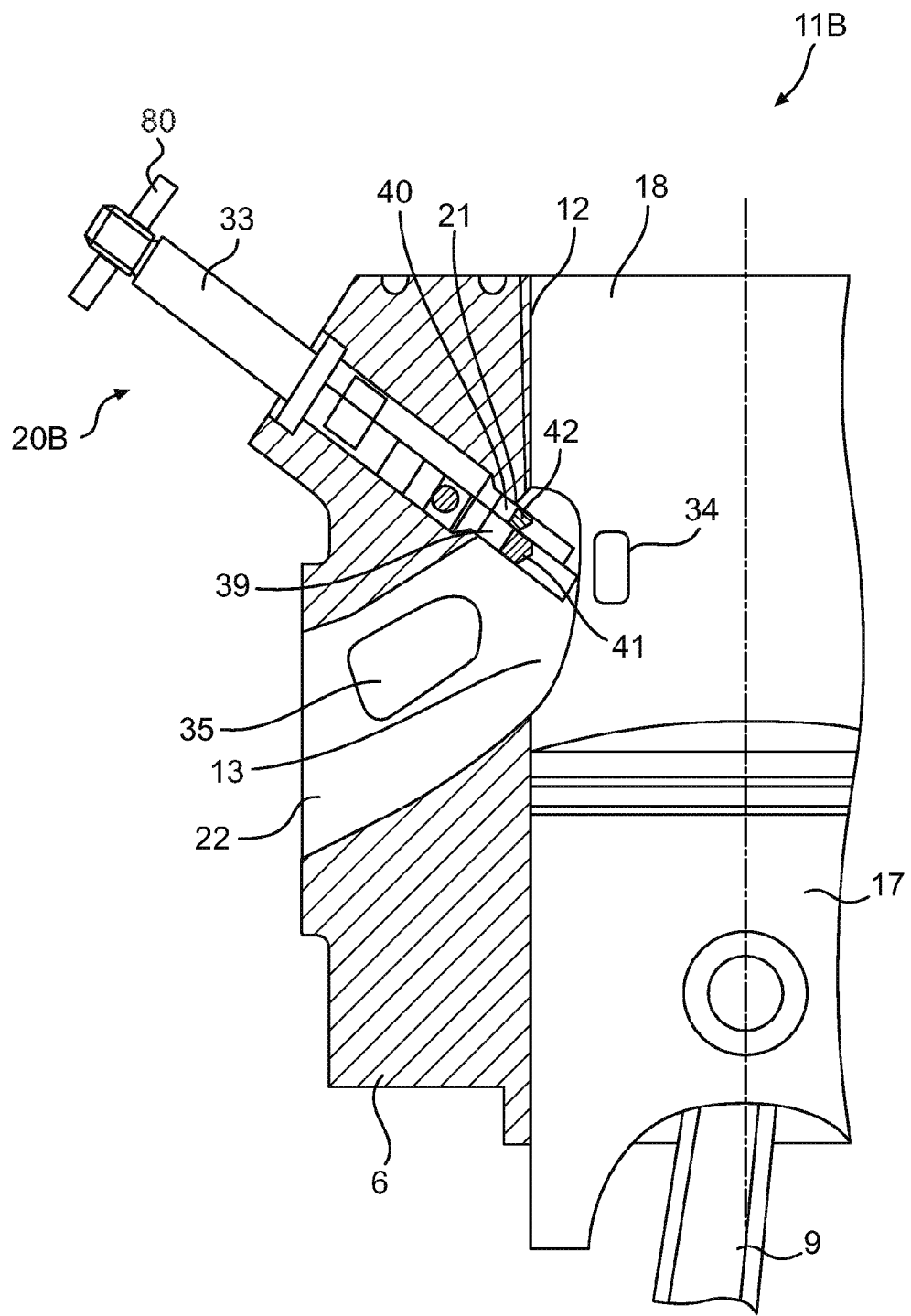
FIG. 9A is a schematic cross-sectional view of the engine of FIG. 2 with the first valve part in a flow restricting position and the second valve part in a flow restricting position.
Figure 9B:
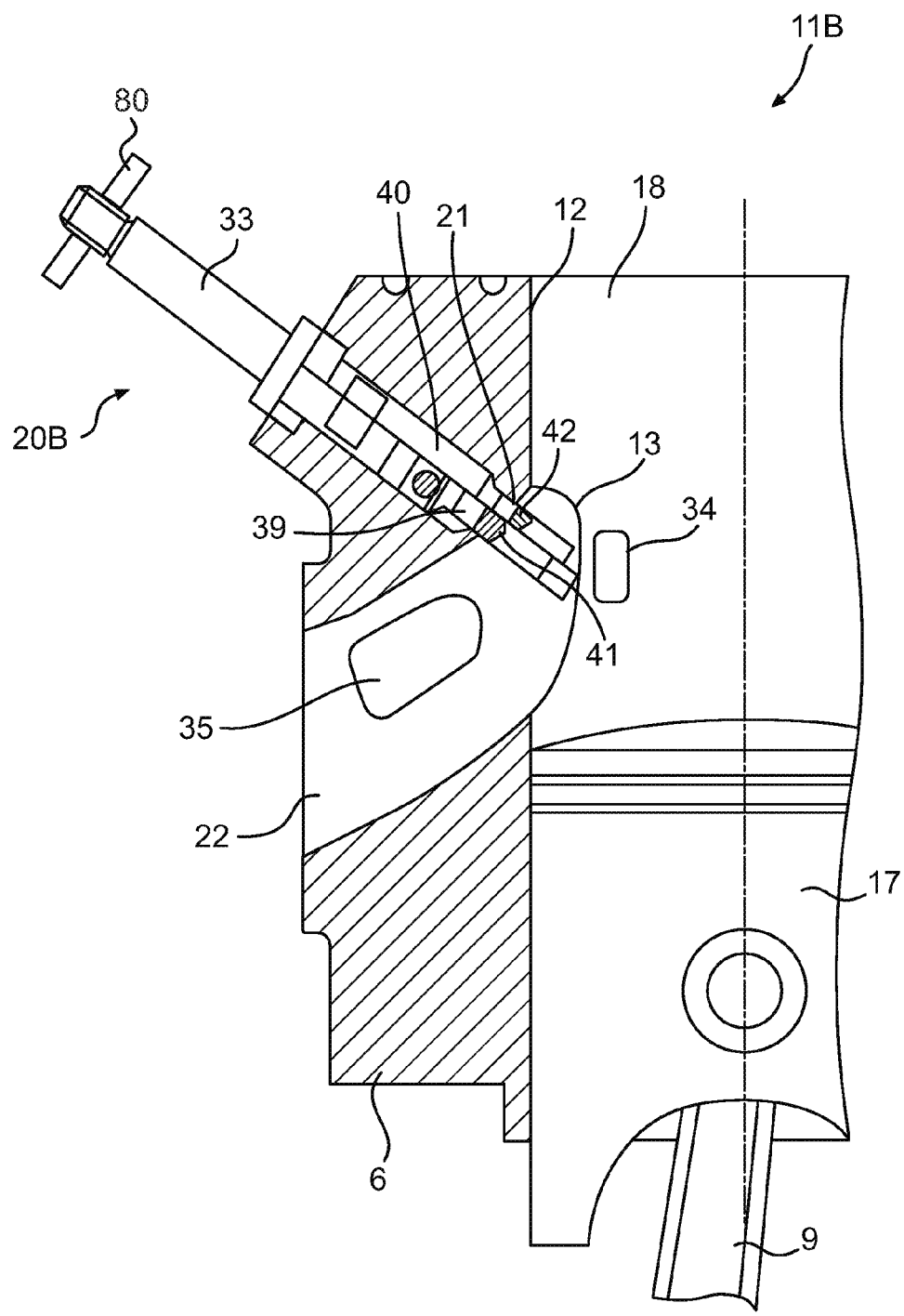
FIG. 9B is a schematic cross-sectional view of the engine of FIG. 2 with the first valve part in an intermediate position and the second valve part in the flow restricting position.
Figure 9C:
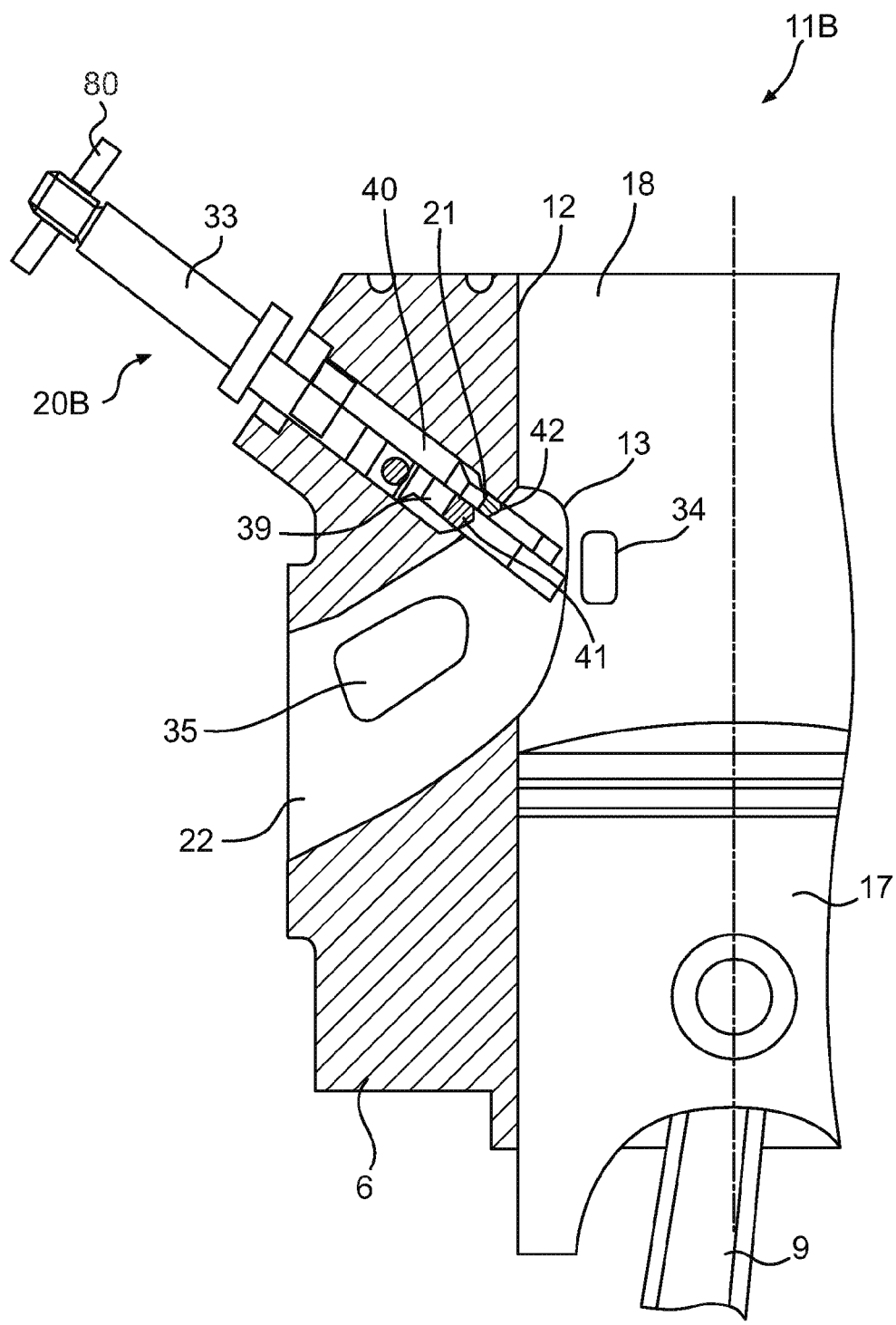
FIG. 9C is a schematic cross-sectional view of the engine of FIG. 2 with the first valve part in a full flow position and the second valve part in a full flow position.

Turning now to FIG. 2, a second embodiment of the valve assembly 10, valve assembly 10B, is shown which has the actuators 30 and where the valves 20, 120 are two-part valves 20B and 120B, described in greater detail below. As shown in FIG. 2 the valve assembly 10B is operatively connected to a two-stroke engine 11B. In addition to the components described above with respect to engine 11A, which have been labelled with the same reference numerals and which will not be described again, the engine 11B has, as best seen in FIGS. 9A to 9C, auxiliary exhaust ports 34 disposed so as to be symmetrical to the corresponding main exhaust port 13. The auxiliary exhaust ports 34 are connected to the exhaust passage 22 by way of auxiliary passages 35. Auxiliary guide channels (not shown) are provided parallel to the guide channel 21 in the area of the auxiliary passages 35 to receive auxiliary valves 44, described in greater detail below, which are associated with the two-part valve 20B.

Turning now to FIGS. 3 to 7, the two-part valve 20B will now be described. The two-part valve 20B includes a first valve part 39 and a second valve part 40. The first valve part 39 and the second valve part 40 each have an edge 41, 42, respectively, shaped so as to match the shape of the cylinder bore 18 of the cylinder 12. In operation, as in FIG. 2, the second valve part 40 is supported and is disposed above the first valve part 39. The first valve part 39 has an integrally formed connector 33 which connects the first valve part 39 to the actuator 30. The second valve part 40 has shoulders 46 which are engaged by the first valve part 39 as the first valve part 39 is moved to a full flow position, as described in greater detail below. A pair of springs 52 is provided between the second valve part 40 and a bottom of the valve actuator 30. The two-part valve 20B also has auxiliary valves 44 for restricting the flow of exhaust gases in the auxiliary exhaust passages 35. The auxiliary valve 44 are separate from and movably connected with the first valve part 39 via apertures 48 (FIG. 3) in the auxiliary valves 44 which engage tabs 50 of the first valve part 39. A valve connecting member 80 is rigidly attached to the connectors 33 in the same manner as in the embodiment shown in FIG. 2.

Figure 12:
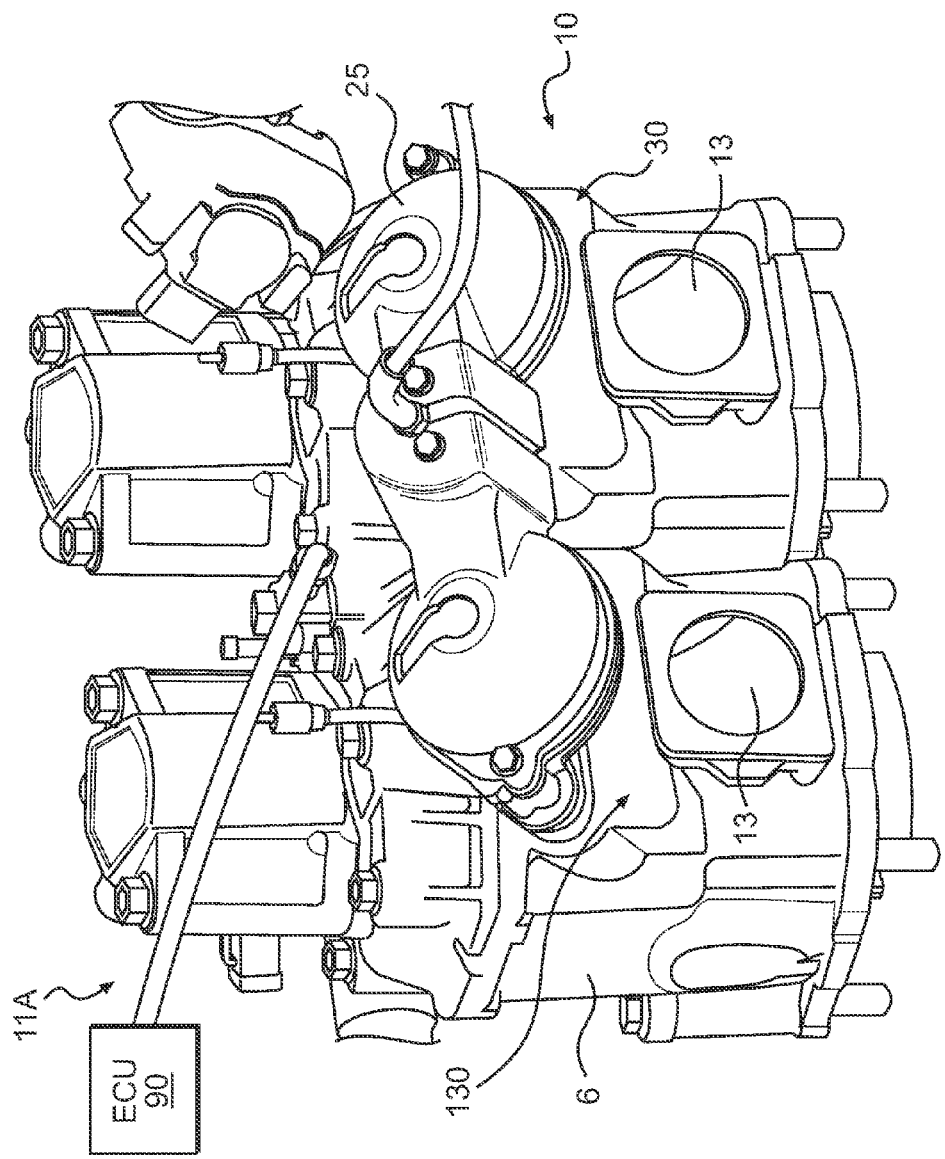
FIG. 12 is a perspective view taken from an exhaust side of a two-stroke engine having a valve assembly in accordance with aspects of the present invention.

The valve actuator 30 will now be described with respect to FIGS. 2 to 7. The valve actuator 30 has a valve housing 26. A first end portion of a diaphragm 24 is connected via a first annular spring 54 onto the valve housing 26. A pressure chamber wall 23 is connected to a second end portion of the diaphragm 24 via a second annular spring 56. The diaphragm 24 and the pressure chamber wall 23 define therebetween a pressure chamber 32 which has a variable volume. The connector 33 of the first valve part 39 passes through the valve housing 26 and is connected to the pressure chamber wall 23 so as to move therewith. A ring 58 and a sealing ring 60 are disposed between the valve housing 26 and the connector 33 to guide the connector 33 as it moves with the pressure chamber wall 23 and to prevent exhaust gases from entering the pressure chamber 32 from the guide channel 21. A spring 27 is disposed inside the pressure chamber 32 around the connector 33 between the pressure chamber wall 23 and the ring 58. The spring 27 biases the first valve part 39 towards a third intermediate position, shown in FIGS. 9B and 10B, described in greater detail below. It is contemplated that the spring 27 could be located elsewhere and still bias the first valve part 39 towards the third intermediate position, such as between the first valve part 39 and a bottom of the valve housing 26. It is also contemplated that the spring 27 could be omitted completely and that the diaphragm 24 could be self-biasing so as to bias the first valve portion 39 towards the third intermediate position, by properly shaping the diaphragm 24 and by making it out of an appropriate material. A cover 25, best seen in FIG. 12, is connected to the valve housings 26 of both valves 20, 120 by bolts 62 to enclose the pressure chamber walls 23 and diaphragm 24 assemblies of valves 20, 120 therebetween. The cover 25 also encloses the bar 80, as well as the position sensor 84 that will be described below in further detail. The valve housing 26 is connected to the cylinder block 6 via bolts 64. A seal 66 is disposed between the valve housing 26 and the cylinder block 6 to prevent exhaust gases from leaving the exhaust passage 22 via the guide channel 21. A port 29 of the pressure chamber 32 disposed on the valve housing 26 fluidly communicates the pressure chamber 32 with at least one pressure source, via a pressure control device, as described below. Another port 31 disposed on the valve housing 26 is used to ventilate the room surrounding the pressure chamber 32.

Figure 8:
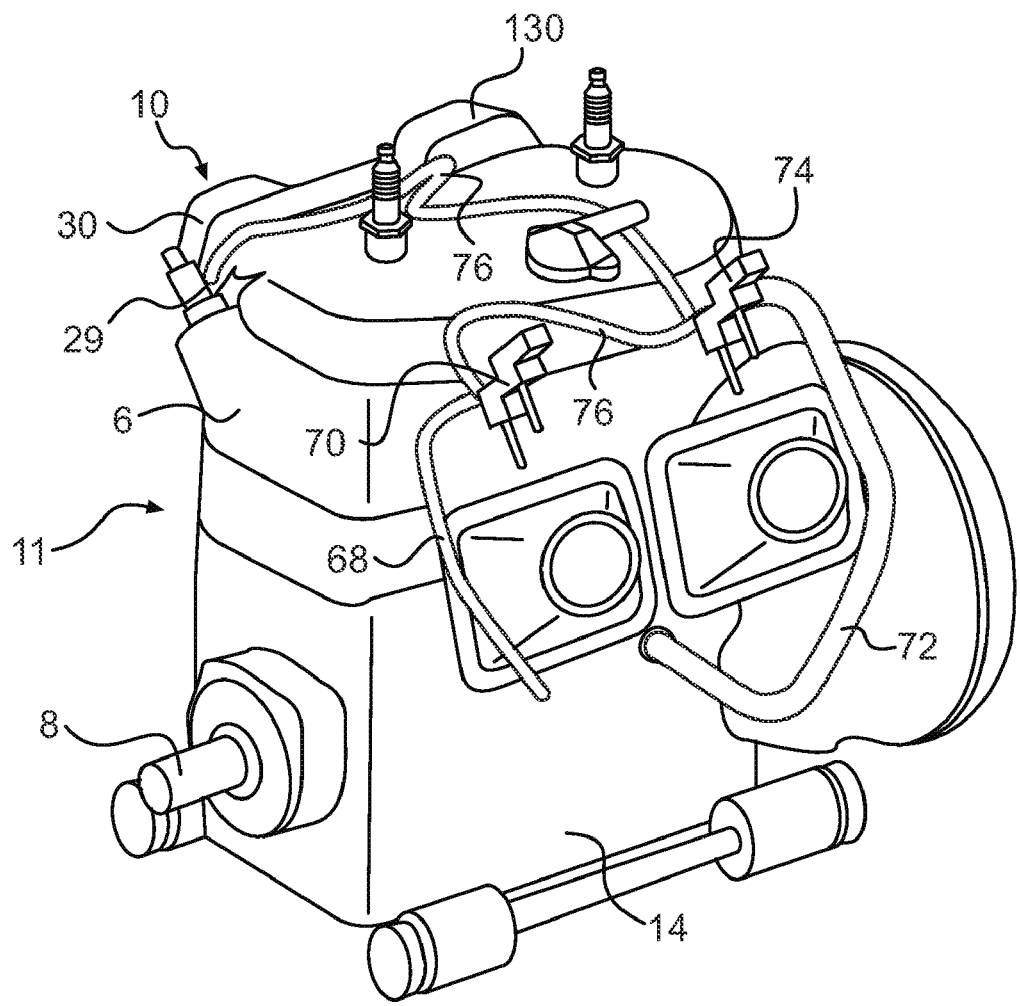
FIG. 8 a perspective view taken from an intake side of a two-stroke engine having a valve assembly in accordance with aspects of the present invention, and a pressure control device.

FIG. 8 illustrates one possible embodiment of a pressure control device for fluidly communicating the pressure chambers 32 of two valve actuators 30 with a plurality of pressure sources. During operation of the engine 11, positive and negative pressures are created inside the crankcase 14. A first line 68 fluidly communicates the crankcase 14 with a first solenoid valve 70. A first one-way valve (not shown) is disposed in the first line 68 to only permit a positive pressure to be supplied to the first solenoid valve 70. A second line 72 fluidly communicates the crankcase 14 with a second solenoid valve 74. A second one-way valve (not shown) is disposed in the second line 72 to only permit a negative pressure to be supplied to the second solenoid valve 74. Lines 76 fluidly communicate the first and second solenoid valves 70, 74 with the ports of the pressure chambers 32 of the valve actuators 30. By selectively opening and closing the solenoid valves 70, 74, it is thus possible to supply one of a positive pressure and a negative pressure to the pressure chambers 32 of the valve actuators. A third valve (not shown) selectively fluidly communicates the pressure chambers 32 with the air surrounding the engine 11 so as to supply an ambient pressure to the pressure chambers 32. It is contemplated that a pressure equivalent to an ambient pressure could be supplied to the pressure chamber 32 by supplying controlled amounts of both the positive and the negative pressures by using solenoid valves 70 and 74. An electronic control unit (not shown) determines which pressure is to be supplied to the pressure chambers 32 based on the engine speed, as described below, and opens and closes the valves accordingly so as to obtain a desired position of the valve 20 of the valve assembly 10. It is contemplated that the electronic control unit could also determines which pressure is to be supplied to the pressure chambers 32 based on a degree of throttle opening or a rate of acceleration of the engine 11. Other pressure control devices are contemplated, such as those disclosed in U.S. Pat. No. 6,244,227 B1, issued Jun. 12, 2001 to Matte, entitled "Valve Assembly Using Pressurized Medium for Controlling Operating Conditions of a Two-Stroke Engine", the entirety of which is incorporated herein by reference.

Figure 14:
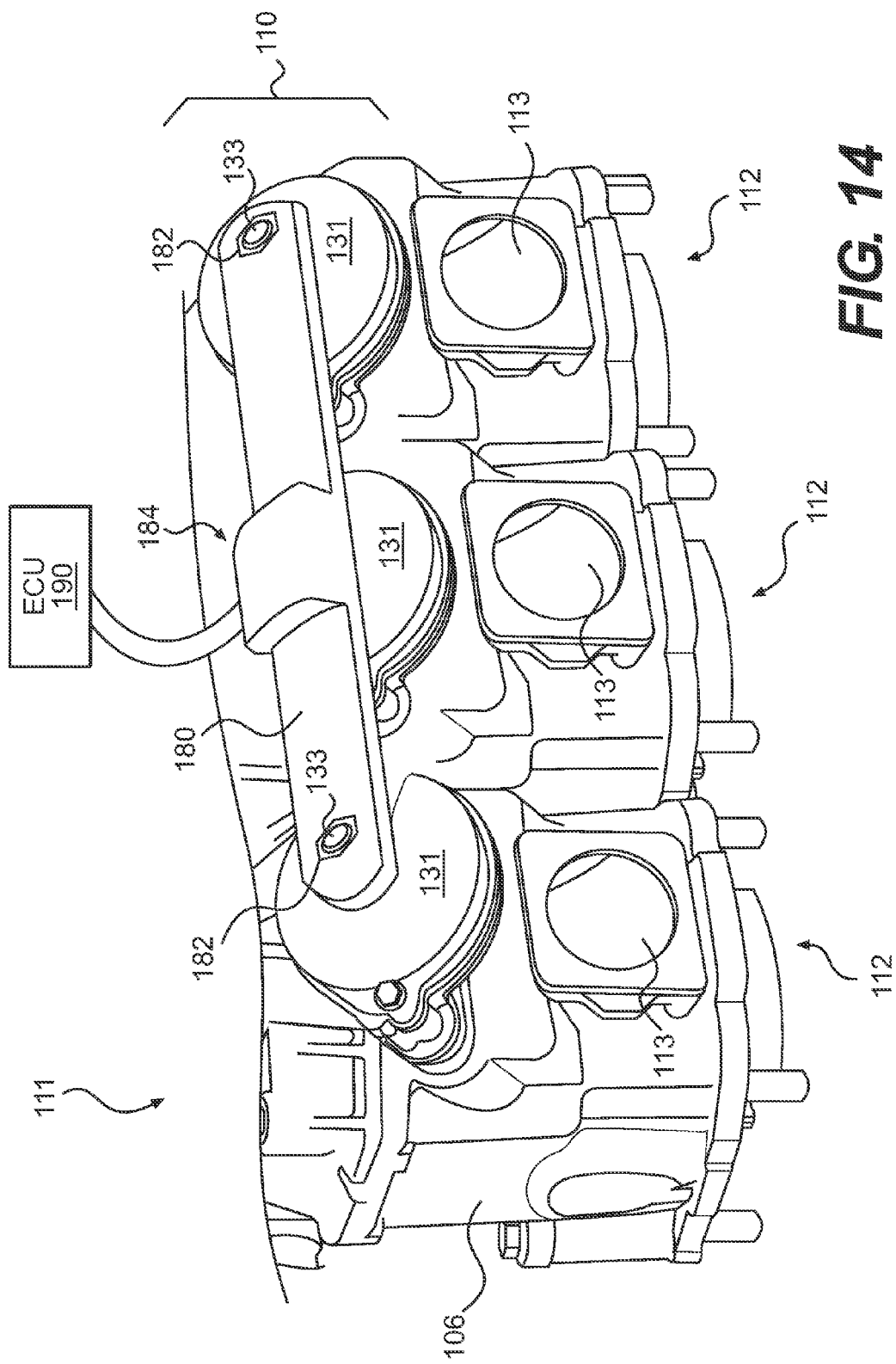
FIG. 14 is a perspective view of a three-cylinder two-stroke engine having an embodiment of a valve assembly in accordance with aspects of the present invention.

Referring now to FIG. 14, a valve assembly 110 in accordance with aspects of the present invention is shown operatively connected to an engine 111 having three cylinders 112. The valve assembly 110 comprises three valve actuators 131. A valve (not shown) is connected to each actuator 131. Each valve may be a one-part valve similar to the valves 20A of FIG. 1 or a two-part valve similar to the valves 20B of FIG. 2. The engine 111 comprises a crankcase (not shown) and a cylinder block 106 connected to the crankcase. Three cylinders 112, disposed in the cylinder block 106, each have a respective exhaust port 113. The cylinders 112 may be formed in the cylinder block 106 in any suitable manner known in the art, such as by disposing cylinder liners in respective cylindrical bores formed in the cylinder block 106, or by coating the inner surface of each of the cylindrical bores with a suitable coating such as Nicasil. An exhaust passage (not shown) communicates with each cylinder 112 via the respective exhaust port 113. The crankcase has respective admission ports and internal chambers corresponding to each cylinder 112. A crankshaft (not shown) is disposed in the internal chambers of the crankcase. Three pistons (not shown) are connected to the crankshaft via respective connecting rods (not shown) and are reciprocable in the respective cylinder bores. The pistons are each adapted to open or close a corresponding exhaust port and a corresponding transferring port. A valve connecting member in the form of a bar 180 is rigidly attached to the connectors 133 of the three valves via threaded nuts 182. It is contemplated that any other suitable connection method known in the art may be used, and that the bar 180 may alternatively be connected to any suitable portion of the valves. The bar 180 moves together with the valves as they are actuated by the valve actuators 131, and maintains a constant angular orientation relative to the valves and the cylinder block 106, thereby ensuring that both valves remain in the same position relative to one another.

Figure 15:
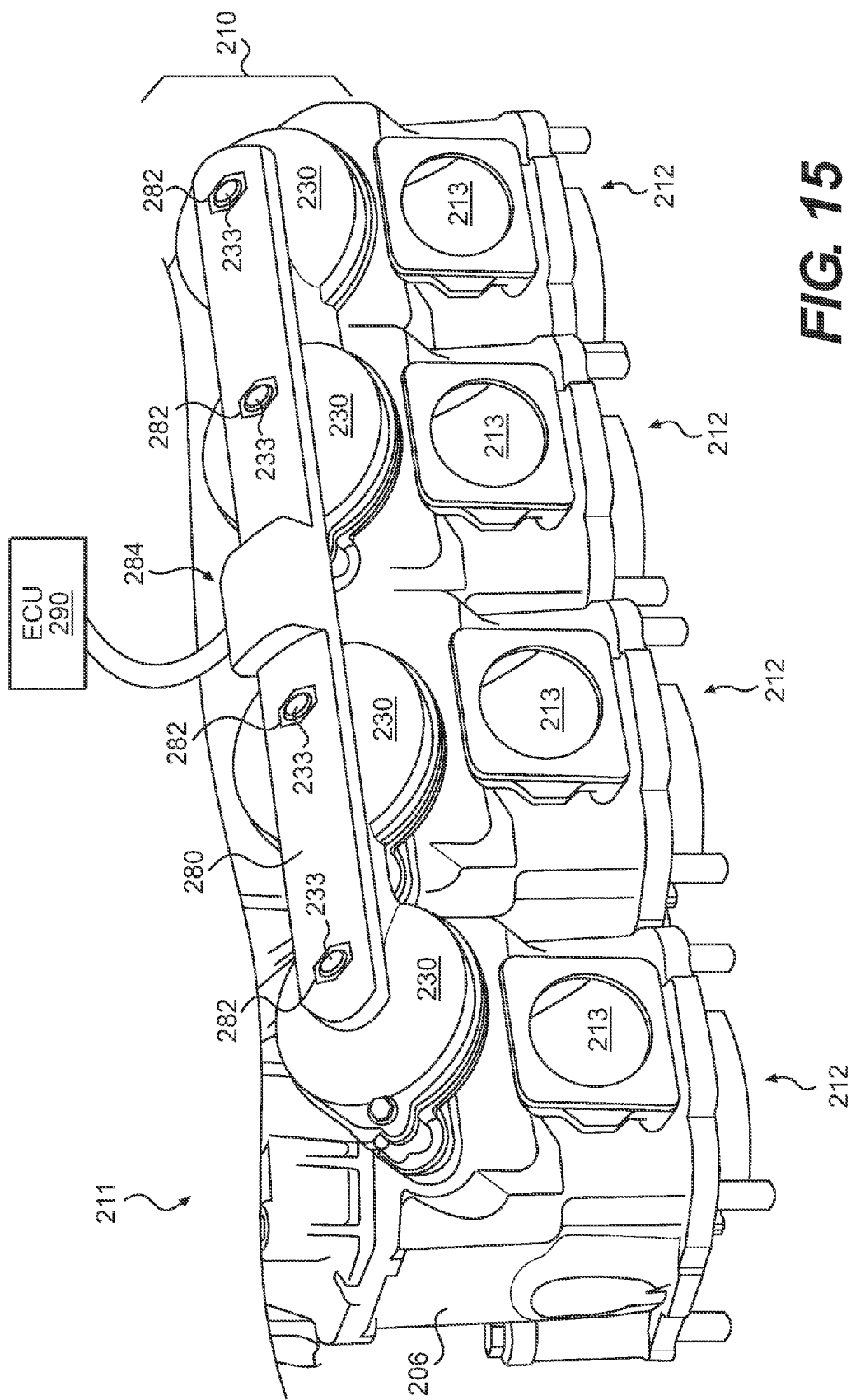
FIG. 15 is a perspective view of a four-cylinder two-stroke engine having an embodiment of a valve assembly in accordance with aspects of the present invention.

Referring now to FIG. 15, a valve assembly 210 in accordance with aspects of the present invention is shown operatively connected to an engine 211 having four cylinders 212. The valve assembly 210 comprises four valve actuators 230. A valve (not shown) is connected to each actuator 230. Each valve may be a one-part valve similar to the valves 20A of FIG. 1 or a two-part valve similar to the valves 20B of FIG. 2. The engine 211 comprises a crankcase (not shown) and a cylinder block 206 connected to the crankcase. Four cylinders 212, disposed in the cylinder block 206, each have a respective exhaust port 213. The cylinders 212 may be formed in the cylinder block 206 in any suitable manner known in the art, such as by disposing cylinder liners in respective cylindrical bores formed in the cylinder block 206, or by coating the inner surface of each of the cylindrical bores with a suitable coating such as Nicasil. An exhaust passage (not shown) communicates with each cylinder 212 via the respective exhaust port 213. The crankcase has respective admission ports and internal chambers corresponding to each cylinder 212. A crankshaft (not shown) is disposed in the internal chambers of the crankcase. Three pistons (not shown) are connected to the crankshaft via respective connecting rods (not shown) and are reciprocable in the respective cylinder bores. The pistons are each adapted to open or close a corresponding exhaust port and a corresponding transferring port. A valve connecting member in the form of a bar 280 is rigidly attached to the connectors 233 of the three valves via threaded nuts 282. It is contemplated that any other suitable connection method known in the art may be used, and that the bar 280 may alternatively be connected to any suitable portion of the valves. The bar 280 moves together with the valves as they are actuated by the valve actuators 230, and maintains a constant angular orientation relative to the valves and the cylinder block 206, thereby ensuring that both valves remain in the same position relative to one another.

Figure 10A:
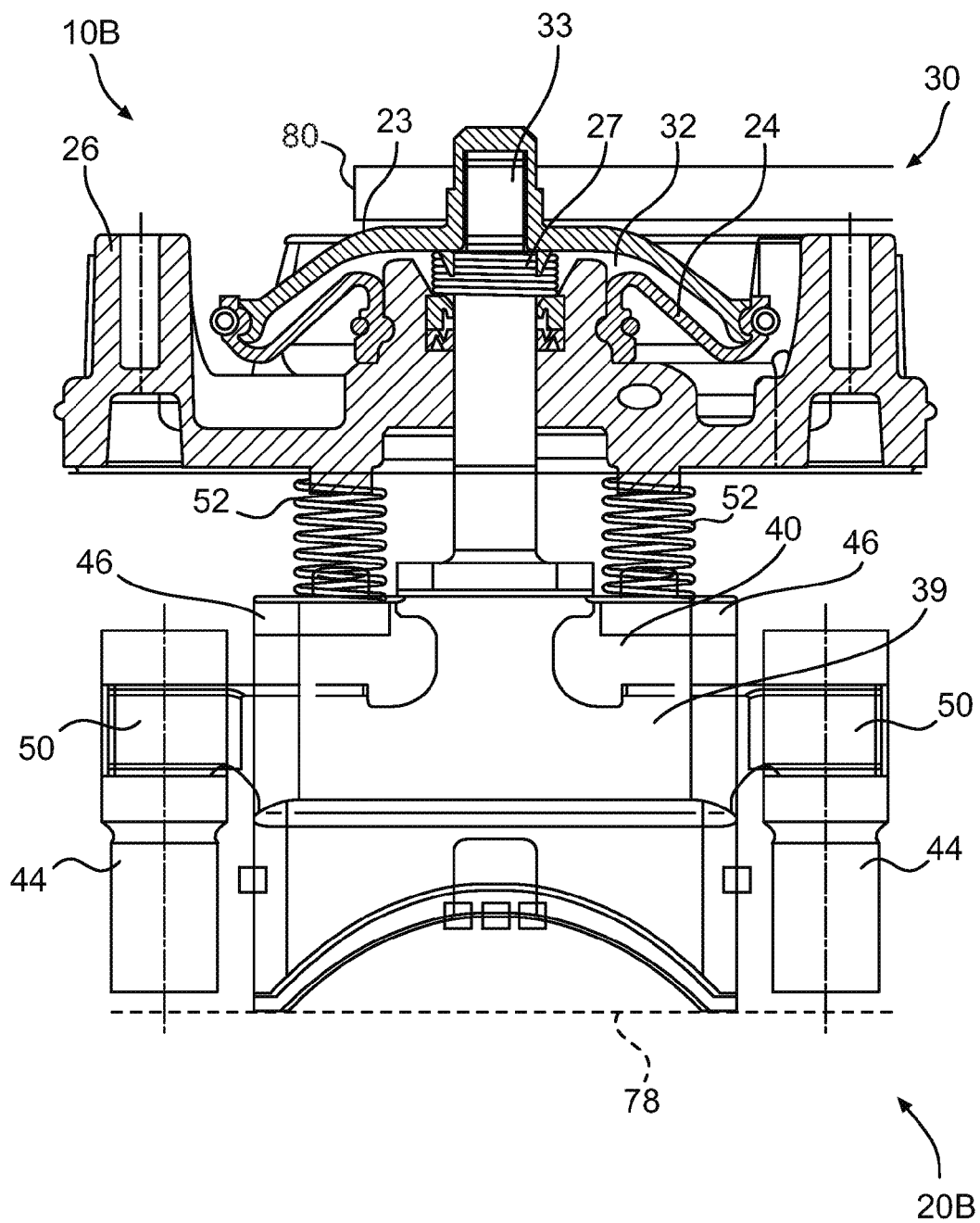
FIG. 10A is a cross-sectional view of the valve assembly of FIG. 4 with the first valve part in a flow restricting position and the second valve part in a flow restricting position.
Figure 10B:
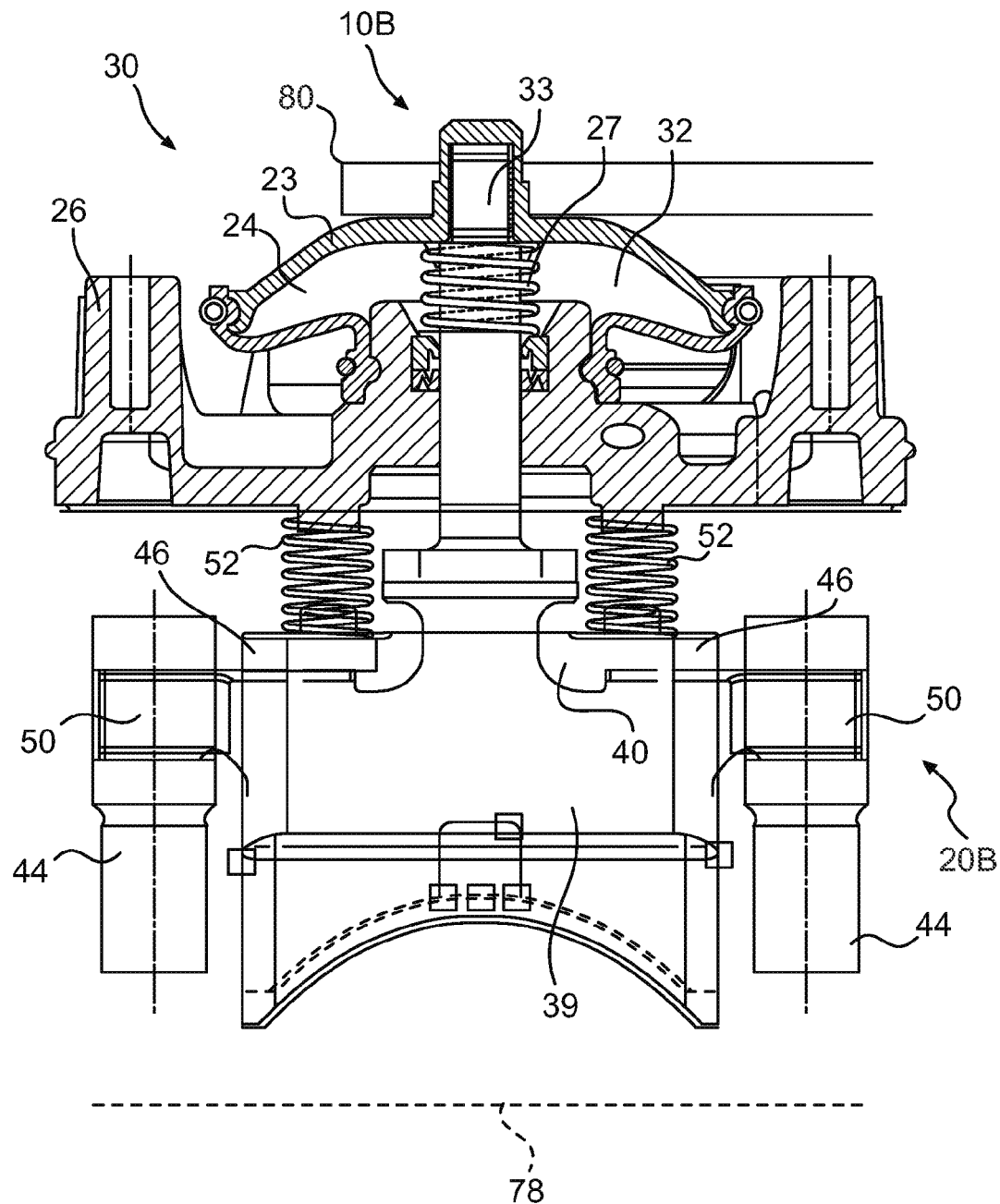
FIG. 10B is a cross-sectional view of the valve assembly of FIG. 4 with the first valve part in an intermediate position and the second valve part in an intermediate position.
Figure 10C:
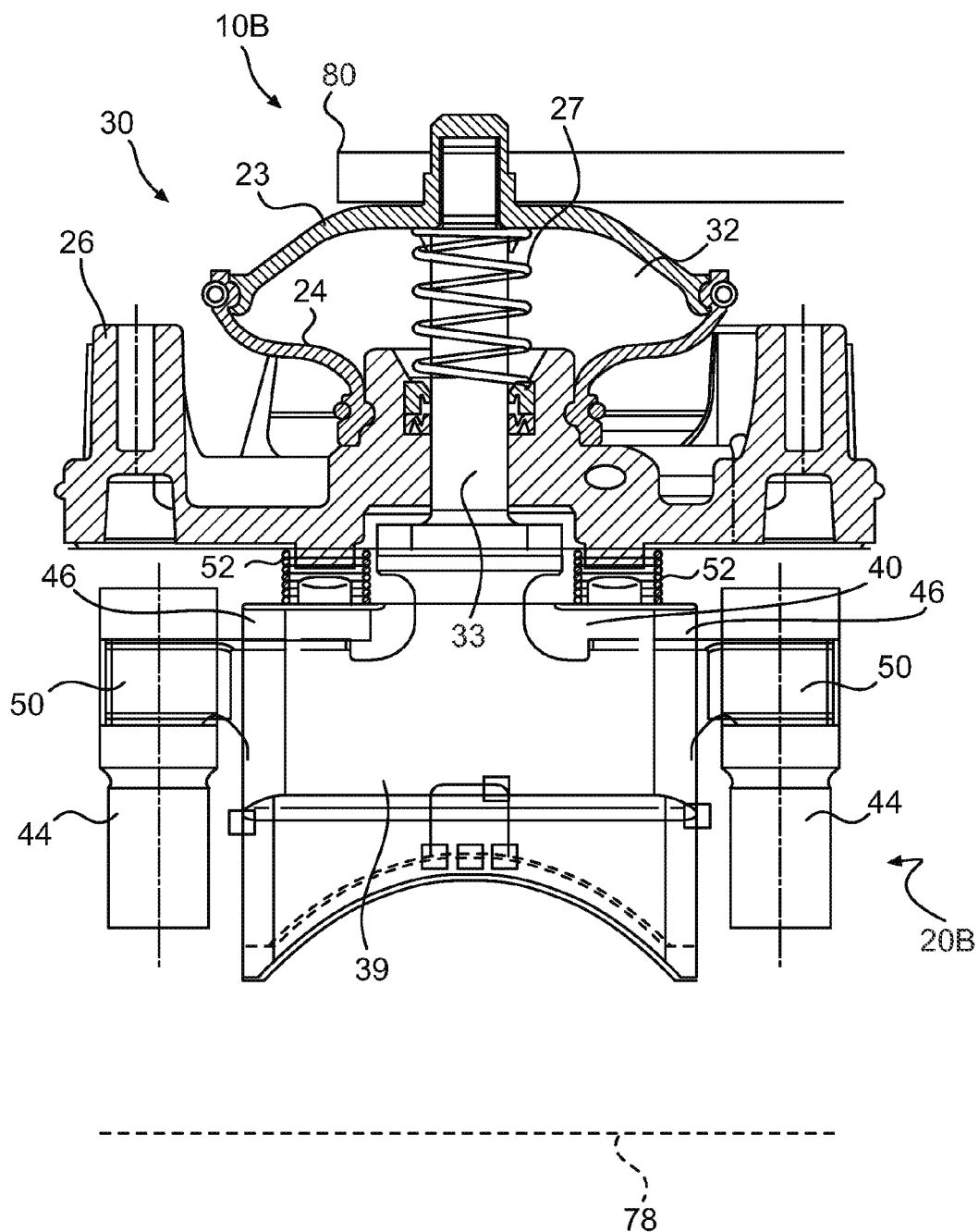
FIG. 10C is a cross-sectional view of the valve assembly of FIG. 4 with the first valve part in a full flow position and the second valve part in a full flow position.

The operation of the valve assembly 10B will now be described in association with FIGS. 9A to 10C with respect to the valve 20B. It should be understood that the valve 120B is actuated in a substantially similar manner, and its operation will not be discussed in detail. It should additionally be understood that the valve assemblies 110 and 210 operate in a substantially similar manner, and their operation will not be described separately in detail. Line 78 in FIGS. 10A to 10C is a line passing through the points where the ends of the edge 41 of the first valve part 39 meet the cylinder bore 18 when the first valve part is in its first flow restricting position shown in FIG. 10A. Line 78 has been added simply to illustrate the movement of the valve 20 relative to the cylinder bore 18.

As previously mentioned, at low engine speeds, it is desirable to restrict the flow of the exhaust gases through the exhaust port 13 and auxiliary exhaust ports 34. Thus, at low engine speeds, the valve 20B is moved to the flow restricting position shown in FIGS. 9A and 10A. To move the valve 20B to this flow restricting position, a negative pressure is supplied to the pressure chamber 32. Since the negative pressure is sufficient to overcome the bias of the spring 27, the volume of the pressure chamber 32 is decreased. This causes the spring 27 to be in compression and the pressure chamber wall 23 moves the first valve part 39 in a first flow restricting position in the exhaust port 13. The auxiliary valves 44 which move with the first valve part 39 also move to a flow restricting position in the auxiliary exhaust passages 35. The second valve part 40 is held in a flow restricting position by the bias of springs 52. When the valve 20B moves to the flow restricting position, the rigid connection between the valves 20B and 120B via bar 80 ensures that the valve 120B moves to the same flow restricting position.

At high engine speeds, it is desirable that the exhaust gases flow freely through the exhaust port 13 and auxiliary exhaust ports 34. Thus, at high engine speeds, the valve 20B is moved to the full flow position shown in FIGS. 9C and 10C. To move the valve 20B to this full flow position, a positive pressure is supplied to the pressure chamber 32. Since the positive pressure is sufficient to overcome the bias of the spring 27, the volume of the pressure chamber 32 is increased. This causes the spring 27 to be in extension and the pressure chamber wall 23 moves the first valve part 39 in a second full flow position where it is withdrawn from the exhaust port 13. The auxiliary valves 44 which move with the first valve part 39 also move to a full flow position where they are withdrawn from the auxiliary exhaust passages 35. As it is moved to its second full flow position, the first valve part 39 engages the shoulders 46 of the second valve part 40 and moves the second valve part 40 to a full flow position. When the second valve part 40 is in its full flow position the springs 52 are in compression. When the valve 20B moves to the full flow position, the rigid connection between the valves 20B and 120B via bar 80 ensures that the valve 120B moves to the same full flow position.

At medium engine speeds, it is desirable to restrict the flow of the exhaust gases through the exhaust port 13 and auxiliary exhaust ports 34, but to a lesser degree than at low engine speeds. Thus, at medium engine speeds, the valve 20B is moved to the intermediate position shown in FIGS. 9B and 10B. To move the valve 20B to this intermediate position, an ambient pressure is supplied to the pressure chamber 32. Since the ambient pressure is insufficient to overcome the bias of the spring 27, the volume of the pressure chamber 32 is changed to reach a volume where the spring 27 is slightly compressed. The spring 27 is slightly compressed due to the bias applied by springs 52 on the first valve part 39 via the shoulders 46 of the second valve part 40. The pressure chamber wall 23 moves the first valve part 39 in a third intermediate position in the exhaust port 13. The auxiliary valves 44 which move with the first valve part 39 also move to an intermediate position in the auxiliary exhaust passages 35. The intermediate positions are intermediate their corresponding full flow and flow restricting positions. The second valve part 40 is held in its flow restricting position by the bias of springs 52. When the valve 20B moves to the intermediate position, the rigid connection between the valves 20B and 120B via bar 80 ensures that the valve 120B moves to the same intermediate position.

Since the spring 27 biases the valve 20B towards the position shown in FIGS. 9B and 10B, the spring 27 will normally return the valve 20B to this position every time the pressure chamber 32 is supplied with the ambient pressure as the ambient pressure will normally be insufficient to overcome the bias of the spring 27. This allows for a position of the valve 20B suitable for operation at medium engine speeds to be reliably obtained.

It is contemplated that the component of the valve actuator 30 could be rearranged such that a positive pressure would move the valve 20B in the position shown in FIGS. 9A and 10A and a negative pressure would move the valve 20B in the position shown in FIGS. 9C and 10C. It is also contemplated that a pressure other than an ambient pressure could be supplied to the pressure chamber 32 to move the valve 20B to the position shown in FIGS. 9B and 10C by using a spring 27 which would be in a neutral position when this other pressure is supplied. It should be understood that positions of the valve 20B intermediate those shown in FIGS. 9A to 10C could be achieved by supplying other pressures to the pressure chamber 32.

If the movement of the valve 20B is impeded, for example by the presence of coking deposits, it is possible that the combined force exerted on the valve 20B by its actuator 30B and the bias of the springs 27, 52 is insufficient to overcome the impediment and move the valve 20B to the desired position corresponding to the pressure in the actuator 30. The valve 120B is subjected to a similar force by its own actuator 130B and its own springs 27, 52 to move the valve 120B to the same desired position. The impediment to the valve 20B also resists movement of the valve 120B, because the bar 80 prevents relative movement between the valves 20B, 120B. As a result, the combined force of both actuators 30B and 130B acts on both valves 20B, 120B, and the combined force may be sufficient to overcome the impediment, for example by breaking or displacing the coking deposits. If the impediment is overcome, both valves 20B, 120B move to the desired position. If the impediment is not overcome, both valves remain in the impeded position.

Figure 13:
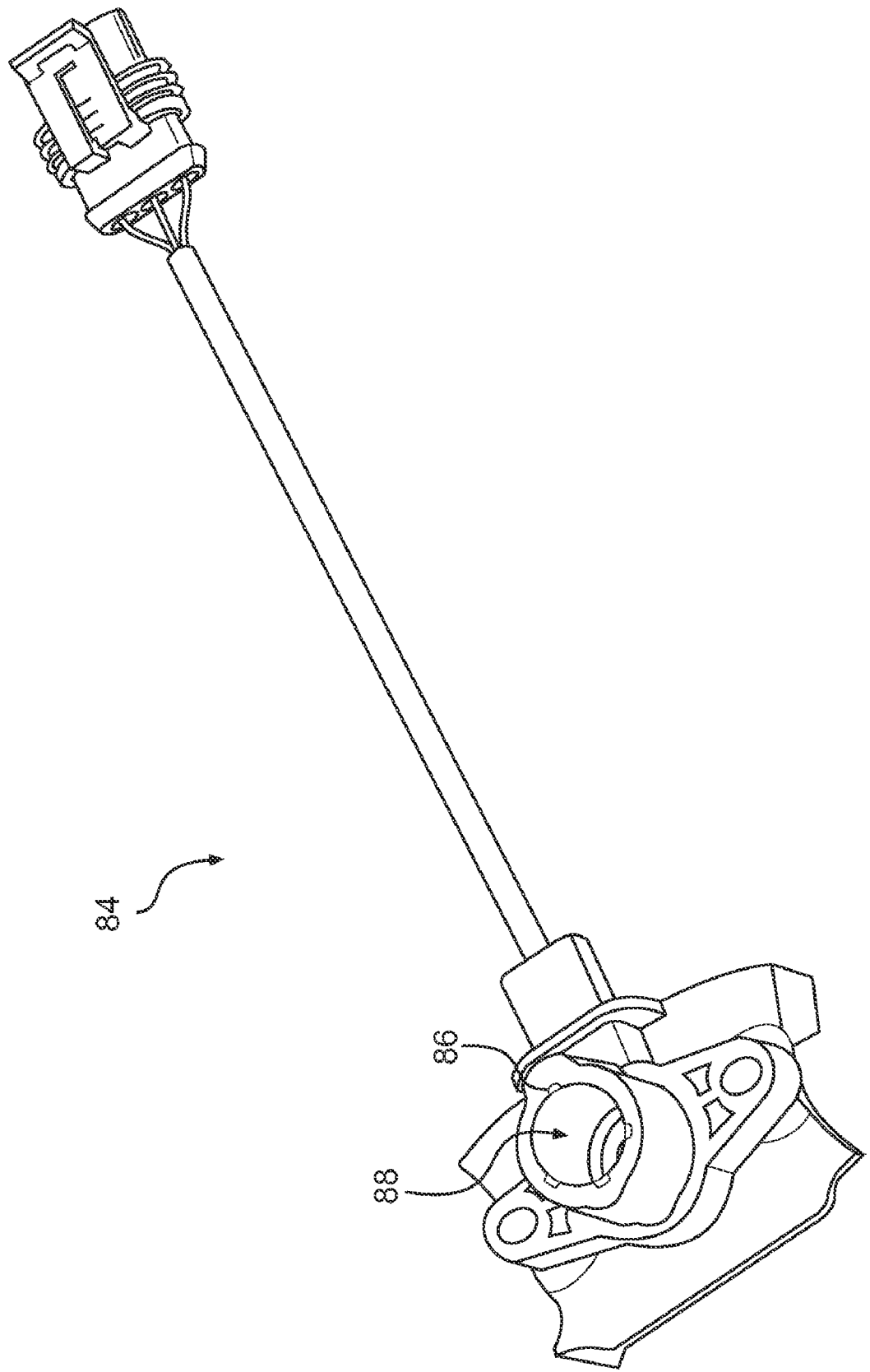
FIG. 13 is a perspective view of a position sensor that can be used with a valve assembly in accordance with aspects of the present invention.

Referring to FIGS. 12 and 13, a position sensor 84 consists of a Hall sensor 86 mounted to the cylinder block 6 via the valve housing 26, and a permanent magnet 88 or ferrous material mounted to the bar 80. It is contemplated that the Hall sensor 86 may alternatively be mounted to the bar 80, in which case the magnet 88 would be mounted to the cylinder block 6. The position sensor 84 is electrically connected to an Electronic Control Unit (ECU) 90 (shown schematically) of the engine 10. The position sensor 84 transmits a signal to the ECU indicative of the current position of the valves 20B, 120B, based on the detected position of the bar 80. The ECU can send signals to other components of the engine 11A to modify various operating parameters of the engine 11A as appropriate, based at least in part on the signal received from the position sensor 84, to improve engine performance. It is contemplated that the position sensor 84 may alternatively be any other suitable type of position sensor known in the art.

Operation of the valve assembly 10A is similar to the operation of the valve assembly 10B in that the valve 20A is actuated generally in the same way as the first valve part 39 of the valve assembly 10B, and, except for the difference described below, will therefore not be described again. The main difference between the operation of the actuators 30 of valve assemblies 10A and 10B, is that since valve assembly 10A does not have springs 52, at medium engine speeds, the volume of the pressure chamber 32 is changed to reach a volume where the spring 27 is in a neutral position.

An engine 11 having a valve assembly 10A or 10B as described above could be used to drive different types of vehicles such as a motorcycle, a snowmobile, an all-terrain vehicle, or a personal watercraft for example.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. An internal combustion engine comprising:
a crankcase;
a crankshaft disposed in the crankcase;
a cylinder block connected to the crankcase;
first and second cylinders disposed in the cylinder block, the first cylinder having a first exhaust port, the second cylinder having a second exhaust port;
a first piston movably disposed within the first cylinder and a second piston movably disposed within the second cylinder, the first and second pistons being operatively connected to the crankshaft;
a valve assembly operatively connected to the cylinder block, the valve assembly comprising:
at least one valve actuator comprising a first actuator and a second actuator;
a first valve operatively connected to the at least one valve actuator, the first valve being movable between a first position wherein the first valve extends a first distance in the first exhaust port and a second position wherein the first valve extends a second distance in the first exhaust port, the second distance being less than the first distance, the first valve being actuated by the first actuator;
a second valve operatively connected to the at least one valve actuator, the second valve being movable between a first position wherein the second valve extends a first distance in the second exhaust port and a second position wherein the second valve extends a second distance in the second exhaust port, the second distance being less than the first distance, the second valve being actuated by the second actuator; and
a valve connecting member connected to the first and second valves and movable therewith;
a position sensor having first and second portions, the first portion of the position sensor being connected to the cylinder block, the second portion of the position sensor being connected to the valve connecting member; and an electronic control unit (ECU) electrically connected to the position sensor,
wherein the engine operates on a two-stroke principle.

2. The internal combustion engine of claim 1, wherein the first and second valves are biased toward one of the first position and the second position.

3. The internal combustion engine of claim 1, wherein each of the first and second valves is movable to a third position intermediate the first position and the second position.

4. The internal combustion engine of claim 3, wherein the first and second valves are biased toward the third position.

5. The internal combustion engine of claim 1, wherein:
each of the exhaust ports is a main exhaust port;
each of the first and second cylinders further includes at least two auxiliary exhaust ports symmetrically disposed with respect to the corresponding main exhaust port, each auxiliary exhaust port communicating with the main exhaust port via an auxiliary exhaust passage; and
each of the first and second valves further includes at least two auxiliary valves being separate from and movably connected to the corresponding valve and movable therewith, each auxiliary valve extending in a respective auxiliary exhaust port.

6. The internal combustion engine of claim 1, wherein each of the first and second actuators comprises:
a diaphragm; and
a pressure chamber defined at least in part by the diaphragm, the pressure chamber being fluidly connectable to at least one pressure source, via a pressure control device, the pressure chamber having a volume variable in response at least in part to pressure supplied to the pressure chamber by the at least one pressure source.

7. The internal combustion engine of claim 1, wherein:
the first and second valves are disposed at least in part outside the cylinder block; and
the position sensor is disposed outside the cylinder block.

8. The internal combustion engine of claim 7, wherein the valve connecting member is connected to the first and second valves via respective portions of the first and second valves disposed outside the cylinder block.

9. The internal combustion engine of claim 1, wherein the position sensor is a Hall effect sensor.

10. The internal combustion engine of claim 1, further comprising:
a third cylinder disposed in the cylinder block, the third cylinder having a third exhaust port; and
a third piston movably disposed within the third cylinder and operatively connected to the crankshaft;
wherein:
the valve assembly further has a third valve operatively connected to the at least one valve actuator, the third valve being movable between a first position wherein the third valve extends a first distance in the third exhaust port and a second position wherein the third valve extends a second distance in the third exhaust port, the second distance being less than the first distance; and
the valve connecting member is additionally connected to the third valve and movable therewith.

11. The internal combustion engine of claim 10, further comprising:
a fourth cylinder disposed in the cylinder block, the fourth cylinder having a fourth exhaust port; and
a fourth piston movably disposed within the fourth cylinder and operatively connected to the crankshaft;
wherein:
the valve assembly further has a fourth valve operatively connected to the at least one valve actuator, the fourth valve being movable between a first position wherein the fourth valve extends a first distance in the fourth exhaust port and a second position wherein the fourth valve extends a second distance in the fourth exhaust port, the second distance being less than the first distance; and
the valve connecting member is additionally connected to the fourth valve and movable therewith.

12. An internal combustion engine comprising:
a crankcase;
a crankshaft disposed in the crankcase;
a cylinder block connected to the crankcase;
first and second cylinders disposed in the cylinder block, the first cylinder having a first exhaust port, the second cylinder having a second exhaust port;
a first piston movably disposed within the first cylinder and a second piston movably disposed within the second cylinder, the first and second pistons being operatively connected to the crankshaft; and
a valve assembly operatively connected to the cylinder block, the valve assembly comprising:
at least one valve actuator;
a first valve operatively connected to the at least one valve actuator, the first valve being movable between a first position wherein the first valve extends a first distance in the first exhaust port and a second position wherein the first valve extends a second distance in the first exhaust port, the second distance being less than the first distance;
a second valve operatively connected to the at least one valve actuator, the second valve being movable between a first position wherein the second valve extends a first distance in the second exhaust port and a second position wherein the second valve extends a second distance in the second exhaust port, the second distance being less than the first distance; and
a valve connecting member rigidly connected to the first and second valves and movable therewith between a first position and a second position, the valve connecting member being movable between the first position and the second position via a translational motion while maintaining a substantially constant angular orientation relative to the cylinder block;
wherein the engine operates on a two-stroke principle.

13. The internal combustion engine of claim 12, wherein the first and second valves are biased toward one of the first position and the second position.

14. The internal combustion engine of claim 12, wherein each of the first and second valves is movable to a third position intermediate the first position and the second position.

15. The internal combustion engine of claim 14, wherein the first and second valves are biased toward the third position.

16. The internal combustion engine of claim 14, wherein:
each of the exhaust ports is a main exhaust port;
each of the first and second cylinders further includes at least two auxiliary exhaust ports symmetrically disposed with respect to the corresponding main exhaust port, each auxiliary exhaust port communicating with the main exhaust port via an auxiliary exhaust passage; and
each of the first and second valves further includes at least two auxiliary valves being separate from and movably connected to the corresponding valve and movable therewith, each auxiliary valve extending in a respective auxiliary exhaust port.

17. The internal combustion engine of claim 12, wherein the at least one valve actuator comprises a first actuator for actuating the first valve and a second actuator for actuating the second valve.

18. The internal combustion engine of claim 17, wherein each of the first and second actuators comprises:
   a diaphragm; and
   a pressure chamber defined at least in part by the diaphragm, the pressure chamber being fluidly connectable to at least one pressure source, via a pressure control device, the pressure chamber having a volume variable in response at least in part to pressure supplied to the pressure chamber by the at least one pressure source.

19. The internal combustion engine of claim 12, wherein the first and second valves are disposed at least in part outside the cylinder block.

20. The internal combustion engine of claim 19, wherein the valve connecting member is connected to the first and second valves via respective portions of the first and second valves disposed outside the cylinder block.

21. The internal combustion engine of claim 12, further comprising:
   a third cylinder disposed in the cylinder block, the third cylinder having a third exhaust port; and
   a third piston movably disposed within the third cylinder and operatively connected to the crankshaft;
   wherein:
      the valve assembly further has a third valve operatively connected to the at least one valve actuator, the third valve being movable between a first position wherein the third valve extends a first distance in the third exhaust port and a second position wherein the third valve extends a second distance in the third exhaust port, the second distance being less than the first distance; and
      the valve connecting member is additionally rigidly connected to the third valve and movable therewith.

22. The internal combustion engine of claim 21, further comprising:
   a fourth cylinder disposed in the cylinder block, the fourth cylinder having a fourth exhaust port; and
   a fourth piston movably disposed within the fourth cylinder and operatively connected to the crankshaft;
   wherein:
      the valve assembly further has a fourth valve operatively connected to the at least one valve actuator, the fourth valve being movable between a first position wherein the fourth valve extends a first distance in the fourth exhaust port and a second position wherein the fourth valve extends a second distance in the fourth exhaust port, the second distance being less than the first distance; and
      the valve connecting member is additionally rigidly connected to the fourth valve and movable therewith.

23. The internal combustion engine of claim 12, further comprising:
   a position sensor having first and second portions, the first portion of the position sensor being connected to the cylinder block, the second portion of the position sensor being connected to the valve connecting member; and
   an electronic control unit (ECU) electrically connected to the position sensor.

* * * * *